United States Patent
He et al.

(10) Patent No.: US 7,035,332 B2
(45) Date of Patent: Apr. 25, 2006

(54) DCT/IDCT WITH MINIMUM MULTIPLICATION

(75) Inventors: Ouyang He, Cupertino, CA (US); Li Sha, San Jose, CA (US); Shuhua Xiang, Fremont, CA (US); Ping Zhu, San Jose, CA (US); Yaojun Luo, San Jose, CA (US)

(73) Assignee: WIS Technologies, Inc., Santa Clara, CA (US)

( * ) Notice: Subject to any disclaimer, the term of this patent is extended or adjusted under 35 U.S.C. 154(b) by 505 days.

(21) Appl. No.: 09/924,140

(22) Filed: Aug. 7, 2001

(65) Prior Publication Data

US 2005/0207488 A1 Sep. 22, 2005

Related U.S. Application Data

(60) Provisional application No. 60/309,239, filed on Jul. 31, 2001.

(51) Int. Cl.
*H04B 1/66* (2006.01)

(52) U.S. Cl. .............................. 375/240.02; 375/240.2; 375/240.25; 375/240.18; 375/240.26; 375/240.01; 375/240.24; 708/402; 708/401; 382/250; 382/233; 382/248; 382/235

(58) Field of Classification Search ........... 375/240.02, 375/240.18, 240.2, 240.25, 240.26, 240.01, 375/240.24; 708/400, 402, 401; 382/250, 382/233, 248, 235
See application file for complete search history.

(56) References Cited

U.S. PATENT DOCUMENTS

| | | | |
|---|---|---|---|
| 5,228,130 A | 7/1993 | Michael | |
| 5,299,144 A | 3/1994 | Bartkowiak et al. | |
| 5,361,220 A * | 11/1994 | Asano | 708/401 |
| 5,398,078 A | 3/1995 | Masuda et al. | |
| 5,633,897 A | 5/1997 | Fettweis et al. | |
| 5,694,127 A | 12/1997 | Tayama | |
| 5,706,001 A | 1/1998 | Sohn | |
| 5,706,002 A | 1/1998 | Meehan et al. | |
| 5,799,201 A | 8/1998 | Lorenz et al. | |
| 5,835,145 A | 11/1998 | Ouyang et al. | |
| 5,941,940 A | 8/1999 | Prasad et al. | |
| 6,038,675 A | 3/2000 | Gabzdyl et al. | |
| RE37,048 E | 2/2001 | McCollum | |
| 6,209,017 B1 | 3/2001 | Lim et al. | |
| 6,243,734 B1 * | 6/2001 | Doshi et al. | 708/607 |
| 6,407,680 B1 | 6/2002 | Lai et al. | |
| 6,421,695 B1 * | 7/2002 | Bae et al. | 708/402 |
| 6,463,445 B1 | 10/2002 | Suzuki et al. | |
| 6,507,293 B1 | 1/2003 | Deeley et al. | |
| 6,516,031 B1 | 2/2003 | Ishihara et al. | |
| 6,523,071 B1 | 2/2003 | Klinger et al. | |
| 6,552,673 B1 | 4/2003 | Webb | |
| 6,587,057 B1 | 7/2003 | Scheuermann | |
| 6,593,860 B1 | 7/2003 | Lai et al. | |

(Continued)

Primary Examiner—Shawn S. An
(74) Attorney, Agent, or Firm—Fenwick & West LLP

(57) ABSTRACT

A method, apparatus, computer medium, and other embodiments for discrete cosine transform and inverse discrete cosine transform (DCT/IDCT) of image signals are described. A DCT/IDCT module includes a plurality of different cores. One embodiment of a core includes two sets of lookup tables to provide multiplication and add operations for the DCT and IDCT functions. Another embodiment of a core include one set of lookup tables, while another embodiment of a core includes no lookup table. The DCT/IDCT module provides forward DCT and IDCT functionality without the use of additional multipliers.

18 Claims, 14 Drawing Sheets

U.S. PATENT DOCUMENTS

| | | |
|---|---|---|
| 6,647,061 B1 | 11/2003 | Panusopone et al. |
| 6,701,405 B1 | 3/2004 | Adusumilli et al. |
| 6,728,862 B1 | 4/2004 | Wilson |
| 2001/0016884 A1 | 8/2001 | Sato et al. |
| 2002/0199040 A1 | 12/2002 | Irwin et al. |
| 2003/0014457 A1 | 1/2003 | Desai et al. |

* cited by examiner

DCT/IDCT WITH MINIMUM MULTIPLICATION

CROSS-REFERENCE TO RELATED APPLICATION

This application claims priority under 35 U.S.C. § 119(e) to co-pending U.S. Provisional Patent Application No. 60/309,239, entitled "Video Processing System with Flexible Video Format," filed Jul. 31, 2001, by Ouyang He, et al., the subject matter of which is incorporated by reference in its entirety herein.

TECHNICAL FIELD

The present invention relates generally to video processing, and in particular to a video compression scheme used with a discrete cosine transfer and inverse discrete cosine transfer having minimum multiplication operations.

BACKGROUND OF THE INVENTION

As interest and advances in the field of digital picture processing continue to increase, so does the need for performing image coding in an efficient manner. A general aspect of image coding is the transmission of pictures over digital communication mediums using bandwidth reduction techniques, like for example, image compression where only as few bits as needed are utilized. The discrete cosine transform (DCT) has emerged as a data compression tool in image coding, as it is especially useful for obtaining picture quality according to various image compression standards, for storing and retrieving images in digital storage media, and for real time image processing with VLSI implementations. One ongoing problem in implementing DCT is that it is computationally intensive, and thereby dependent upon a large number of multiplication operations along with associated hardware that is also large and complex in design and implementation.

The large number of multipliers required for conventional DCT implementations are particularly problematic for the minimal placement and routing requirements of VLSI, ASIC and System-on-Chip (SoC) applications being used in increasing smaller and more streamlined multimedia-based devices and appliances. As many hand-held portable devices equipped to handle multimedia video formats continue to become increasingly smaller in size, it would be ideal if the video compression hardware for providing DCT processing were streamlined, that is, with logic designed so that the number of necessary multipliers are reduced, and so that the routing, placement, and layout of logic and circuit components are compact, have an uncomplicated design, but are enabled to accommodate complex calculations.

Additionally, conventional DCT techniques also are also problematic in that the errors generated with floating point results may be large. One factor contributing to this drawback stems from prior art approaches adopting 12-bits internal address precision. Frequently, stages of additional multipliers are needed to improve the precision of the DCT and inverse DCT (IDCT) results, but this just increases the size and area of the chip, and results in increased power consumption. Accordingly, there is a need for an approach that improves the precision of the DCT results without these drawbacks.

Also, many proposed image compression standards have DCT-based algorithms that require the IDCT ($DCT^{-1}$). The additional circuitry required for IDCT becomes problematic in keeping chip size as small as possible. It would therefore be beneficial if there were a DCT hardware design where the same architecture could be shared to perform dual functions in the nature of DCT and IDCT. Such a design would streamline the chip area required for DCT and IDCT processing.

SUMMARY OF DESCRIBED EMBODIMENTS

The present invention overcomes the deficiencies and limitations of the prior art by providing a system for video compression of frames of pictures (images). One embodiment in accordance with the present invention includes a novel system for performing discrete cosine transform and inverse discrete cosine transform using 4-bit lookup tables (LUTs) instead of introducing additional multipliers to perform the multiply and add operations. In that particular embodiment, the system includes a base platform (back end sub-system) having a processor, system bus and interrupt controller, memory device, memory controller, and multi-channel controller. Digitized video signals originating from a source are received by an audio/visual input interface which is coupled to a system bus. The system further includes a front end sub-system having a discrete cosine transform (DCT) module capable of functioning also as an inverse discrete cosine transform (IDCT) module, a quantizer capable of functioning as an inverse quantizer, a variable length coding encoder, one or more block SRAMs, and a motion estimation and compensation (MEC) engine having a stream buffer with a macroblock SRAM. The DCT/IDCT module is well-suite to work with a variety of vide processing systems and video compression systems in addition to the particular implementation described.

In one embodiment in accordance with the present invention, the DCT/IDCT module includes a plurality of cores communicatively coupled together to perform forward two-dimensional DCT and IDCT operations. The cores comprise one of four types. The first type of core does not use any LUTs. The second and third types of cores each uses a pair of LUTs loaded with different result coefficients. One LUT is 16-bits, and the other LUT is 12-bits. The fourth type of core uses two pairs of LUTs, wherein two LUTS are 16-bits, and the other two LUTs are 12-bits. These LUTs have 4-inputs and 16-outputs, so that the result is 32 bits. In the respective cores, each LUT of a pair processes data simultaneously. The LUTs significantly reduces the large number of multiplication operations required with conventional DCT and IDCT approaches.

According to one aspect of the present invention, the DCT/IDCT module achieves 17-bits internal address precision without the need for additional multipliers or stages of multipliers to improve the precision of DCT results.

In another aspect of the present invention, the DCT/IDCT module is capable of performing DCT, IDCT, and the dual functions of DCT and IDCT (DCT/IDCT) using the same hardware architecture. Accordingly, the hardware design of the DCT/IDCT module is simplified since only one copy is needed without additional multipliers. This is particularly useful for VLSI, SoC and ASIC applications, which typically have increasingly small "real-estate," meaning chip area and size. Moreover, with the present invention, DCT and IDCT operations performed during real time encoding of MPEG-2 are easily accomplished for a macroblock within 2000 clock cycles.

The features and advantages described in this summary and the following detailed description are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The teachings of the present invention can be readily understood by considering the following detailed description in conjunction with the accompanying drawings.

Figure 1A:
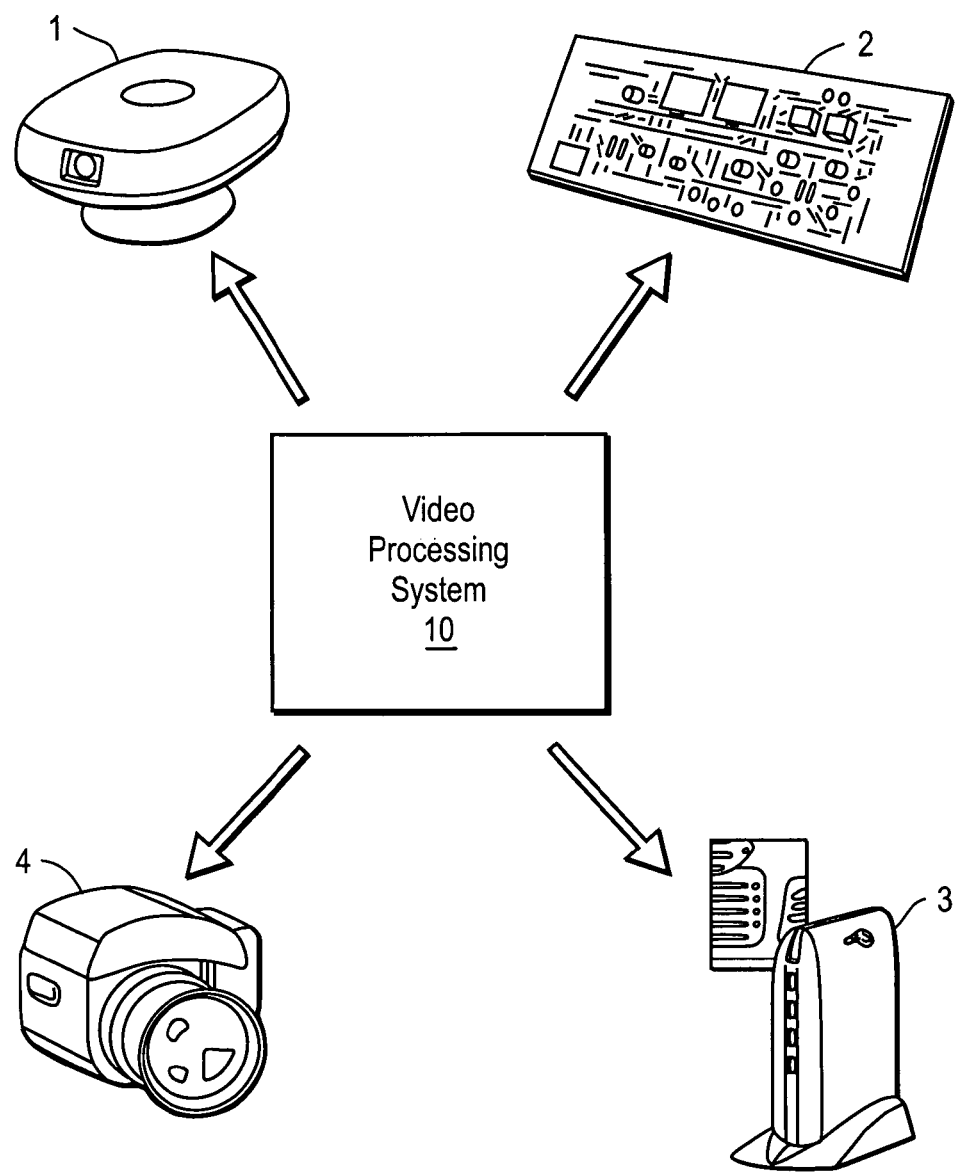
FIG. 1A is an illustration of various exemplary applications that work suitably well with the video processing system in accordance with the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Introduction

A system, method, computer medium and other embodiments for video encoding, motion compensation and improving motion estimation are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention with unnecessary details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as (modules) code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer-based system memories or registers or other such information storage, transmission or display devices.

Throughout the description presented, reference will be made to the symbol "x" as indicating a multiplication operation, and as a description of the number of rows by the number of columns in an array, depending on the context. When the symbol "x" refers to a multiplication operation, the symbol "•" may be used interchangeably as will be recognized by those skilled in the art. In general, the context where the symbol "x" refers to the number of rows by the number of columns in an array arises in describing a block of pixels representing an image.

One aspect of the present invention includes an embodiment of the process steps and instructions described herein in the form of a computer program. Alternatively, the process steps and instructions of the present invention could be embodied in firmware or hardware, and when embodied in software, could be downloaded to reside on and be operated from different platforms used by video processing systems and multimedia devices employed with real time network operating systems and applications.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. In one aspect in accordance with the present invention, a Multiple Instruction stream Multiple Data stream (MIMD) computer architecture will be described, wherein each processor operates to process its own set of instructions simultaneously and independently of others.

The algorithms and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts.

Figure 1B:
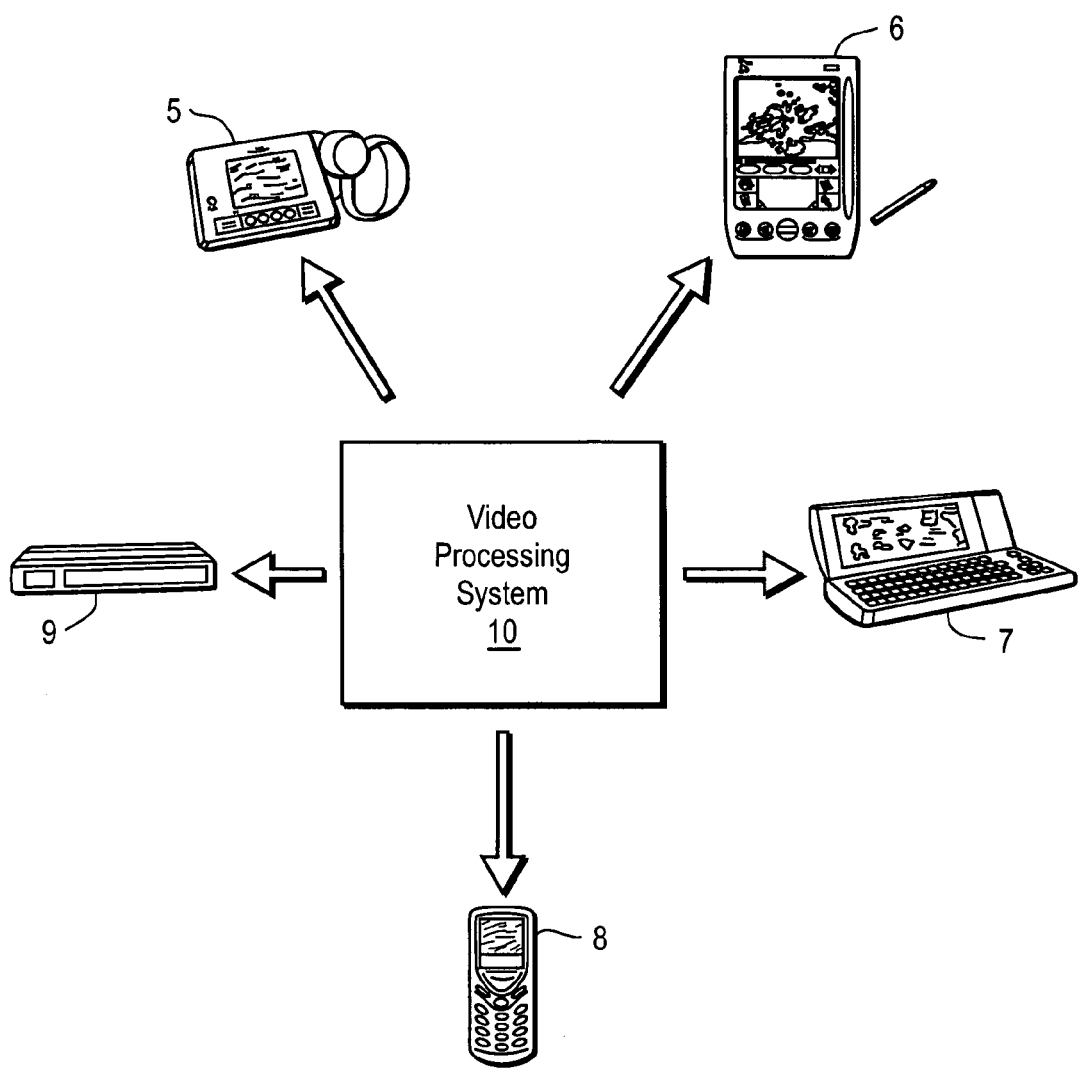
FIG. 1B is an illustration of additional exemplary applications of FIG. 1A.

FIGS. 1A–1B are illustrations of various exemplary applications in which the video processing system 10 in accordance with the present invention will work suitably well. Such applications include a high quality PC video camera 1 used for video conferencing or as a video recorder. Another application includes video capture boards 2, which may be enabled with MPEG-1, MPEG-2, MPEG-4, H.263 and H.261 capability. Yet another application includes a video capture box 3 which may be enabled with MPEG-1, MPEG-2, MPEG-4, H.263 and H.261 capability, by way of example. Video capture boxes 3 can also be used for time shifting purposes. Still another application comprises an IP (Internet Protocol)-based remote video surveillance system 4 outputting MPEG-1, MPEG-2, MPEG-4 or other type of video format. One type of video format that works suitably well in accordance with the present invention is a WIS GO Stream format from WIS Technologies, Inc. of San Jose, Calif. In FIG. 1B, other applications that are well-suited for video processing system 10, include the following: (1) high quality video cameras 5 with full D1 broadcasting quality; (2) personal digital assistants 6 operable as a video camera or as a visual communication device; (3) mobile visual communication devices 7; (8) portable wireless telephones 8 enabled to operate with visual communication by MPEG-4 over CDMA; and (9) personal video recorders (PVRs) 9 also known as digital video recorders (DVRs), and STB, along with other devices providing a home video gateway, visual conferencing and multimedia communication. It will be appreciated by those skilled in the art that the above-mentioned types of applications are only examples, and that the video processing system in accordance with the present invention works suitably well with a wide variety of applications.

Figure 2:
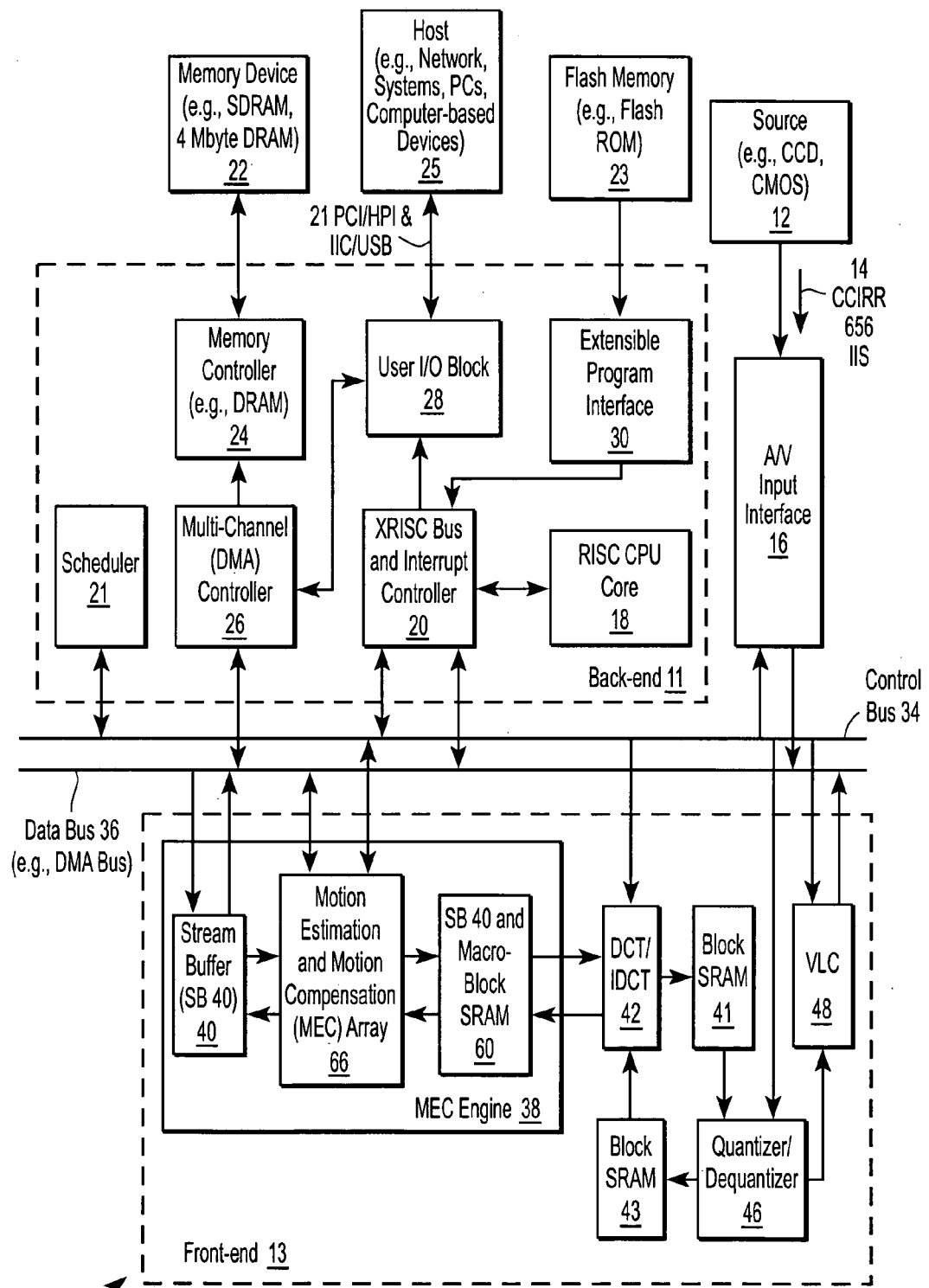
FIG. 2 illustrates a block diagram of one embodiment of a video processing system in accordance with the present invention.

FIG. 2 illustrates one implementation of a video processing system 10 that may be used to perform the motion estimation and compensation processing in accordance with the present invention. One aspect of video processing system 10 includes video compression of moving images as part of an encoding process. From the discussion to follow, it will become apparent that the present invention is not limited to the system 10, but may work suitably well with other video processing systems and video compression systems. In the implementation of FIG. 2, system 10 includes a processor-based platform 111 (back end 11), and a front end 13. Data from source 12 is received by an audio/visual (A/V) interface 16. The AV interface 16 is synchronized with a pixel clock PCLK (not explicitly shown), which may be operating at a low frequency, like 27 MHz by way of exmaple. A data (pixel) bus 14 allows the transfer of pixel data from the source 12 to the AV interface 16. Every clock cycle, a pixel can be input through the pixel bus 14 with a valid pixel signal. Those skilled in the art will recognize that the input timing can be controlled by horizontal and vertical synchronize signals.

The source 12 may be a multitude of devices that provide a digitized video bit stream (data stream), like for example, from a Complementary Metal Oxide Semiconductor (CMOS) device or Charge Coupled Device (CCD) sensor (with or without glue logic) like that used in a digital camera and PC camera. Other types of source devices that may work suitably well with the present invention, include by way of example, the Philips® 711x video digitizer and processor chip. By way of background information, in a digital camera, CCDs can be analogized to operating like film. That is, when they are exposed to light, CCDs record the intensities or shades, of light as variable charges. In the field of digital cameras, the charges are converted to a discrete number by analog to digital converters. It will be recognized that other types of sources capable of generating a digitized video bit stream may work suitably well with the present invention, including sources in the nature of a personal video recorder, a video-graphics capture and processor board, and a digital CAM recorder.

In general, source 12 generates an uncompressed video data bit stream 14, which may be of multiple formats. By way of example, the format of data stream 14 can comply with the CCIR (Consultative Committee for International Radio, now ITU-R) 601 recommendation which has been adopted worldwide for uncompressed digital video used in studio television production. This standard is also known as 4:2:2. Also, data stream 14 may be the parallel extension standard, namely CCIR 656 with PAL and NTSC, which had been incorporated into MPEG as the Professional Profile. CCIR 656 sets out serial and parallel interfaces to CCIR 601. Other suitable video formats include: YUV 4:2:2 interlace; 8-bit YUV with Vsysnc/Hsysnc/Fodd or Vref/Href format, interlace and progressive; 10-bit RGB Bayer with Vsysnc/Hsync CMOS sensor format. The support size can vary from 352×288 to 720×480 (30 fps) or 720×576 (25 fps), while the support input frame rate can vary from 10 fps to 30 fps. It is noted that these values are provided by way of example, and that the invention is not limited to these formats and parameters, but may work suitably well with other types of formats and parameters. When data stream 14 includes an audio component, the format of the data stream could also be in IIS (inter IC signal) format. Of course, the appropriate IIS data rates, which typically are at speeds of several Mbits/second, may be selected for transferring audio data. It will be appreciated that CCIR 656 and IIS are only examples of possible digital data formats, and that other formats are equally possible. AN interface 16 includes necessary ports and circuitry to receive the incoming (video and/or audio) signals and to buffer data from such signals.

The base platform 11 is preferably a general microprocessor-based computing system. In one implementation, the electronics of platform 11 are implemented as a single ASIC incorporating a processor 18, a system controller 20, memory device 22, memory device controller 24, a multi-channel (e.g., Direct Memory Access DMA) controller 26, an input/output (I/O) interface 28, and an extensible program interface 30. In particular, the processor 18 may be any suitable processor with on-chip memory for encoding sub-sampled video signals, such as an Intel i860 pixel processor, programmed to implement the motion estimation and compensation techniques of the present invention. Preferably though and according to one implementation, processor 18 is a RISC-based CPU capable of controlling and coordinating the transfer of blocks of data, but not necessarily handling the video processing. By doing so, this keeps manufacturing costs of system 10 low, which is particularly beneficial when system 10 is utilized in VLSI, ASIC and System-on-Chip (SoC) applications. By way of example, suitable general parameters for choosing a low cost RISC CPU 18 include a 16 bit arithmetic logic unit (ALU), an 18 bit instruction set, and an operating speed up to 100 MHz. Exemplary applications suitable for the incorporation of system 10 include digital video recorders, remote video surveillance systems, video capture boxes, small portable handheld devices such as digital cameras, multimedia-enabled cellular phones and personal digital assistants (PDAs), and other media-based devices and appliances. The (XRISC) bus and interrupt controller 20 handles the workflow of the data and control signals for the computing processes of CPU 18, including for example, handling hardware and software interrupts, as well as those I/O signals generated.

Memory device 22 may be any suitable computer memory device for storing picture data, such as a video random access memory (VRAM) or dynamic RAM (DRAM) device, under the control of memory device controller 24. Memory device 22 is shown as being external to platform 11 in FIG. 1, but may be integrated into platform 11 in other embodiments of system 10. In one embodiment where memory device 22 is a DRAM, controller 24 is selected to be a corresponding DRAM controller performing the physical transfers of data between the memory device 22 and the multichannel controller 26. In this embodiment, controller 26 may be a DMA a controller selected to accommodate any suitable number of DMA channels used to transfer the retrieved video data into packed pixel format or planar bit maps, typically from the memory device 22 to each data block for processing by the MEC engine 38. By way of example, DMA controller 26 may use 8, 32 or any other number of channels, to transfer data from the DRAM 22 to each data block without necessarily utilizing the processing resources of CPU 18. In one embodiment, the DMA controller 26 is designed as a two-dimensional controller, operating on at least an instruction of pre-specified length, along with a start command, and source address. The multi-channel DMA controller 26 can include a plurality of channels, each with configuration registers holding information, such as the start address of data, the end address of data, the length of data transferred, type of stop transfer mechanism, and the source address of the data. Alternatively, the multi-channel controller 26 may facilitate the transfer of data from I/O block 28 to MEC engine 38, including by way of example, data from a host bus 21 coupled to I/O interface 28.

I/O interface 28 couples system 10 to various external devices and components, referred to as hosts 25, using a variety of data standards and formats. For example, I/O interface 28 can include an output format along host bus 21 compatible with: a Peripheral Component Interconnect (PCI) bus typically having a wider bandwidth than the traditional ISA bus, and allowing peripherals to transfer data at higher speeds; a Universal Serial Bus (USB) hardware interface for low-speed peripherals such as the keyboard, mouse, joystick, scanner, printer and telephony devices, and also MPEG-1 and MPEG-2 digital video; IIC (inter IC control); and Host Parallel Interface (HPI). These types of ports in I/O interface 28 are only examples of possible port data formats, and other formats are equally possible. I/O interface 28 can be coupled to a variety of different hosts 25, including for example, PCs, applications supported by network enabled systems, servers, high quality PC video cameras for video conferencing, video recorders, video capture boards for MPEG-1, MPEG2, MPEG-4, H.263 and H.261, IP based remote video surveillance systems, video capture boxes for time shifting purposes, network computing systems, mobile visual communication, wireless communication by MPEG-4 over CDMA, and PDA enabled with multimedia features. Hosts 25 include driver level transcoding software to convert the compressed stream of data from I/O block 28 into MPEG-1, MPEG-2, MPEG-4, H.263 formats, by way of example.

Extensible program interface 30 enables data to be loaded into system 10 from flash memory device 32. A flash memory typically stores its content without the need for power, unlike a DRAM. Any number of suitable flash memory 32 devices may be used with the present invention, such as digital film in a PC card, a flash ROM, memory stick formats, and SmartMedia.

The A/V interface 16, bus and interrupt controller 20 and multichannel controller 26 are coupled to one or both of a control bus 34 and data bus 36. According to one implementation, data bus 36 is a DMA bus. However, data bus 36 may be any suitable digital signal transfer device, including an Industry Standard Architecture (ISA) bus, an Extended ISA (EISA) bus, a PCI bus, or a VL bus. When data bus 36 is a DMA data bus, after initialization and during active capturing of the incoming video signal, DMA controller 26 requests the DMA bus 36 and, after acquiring the bus, will perform burst writes of video data to the memory 22 to be described further with MEC engine 38. In the particular implementation, databus 36 is selected to be 36 bits, which is a suitable width for VLSI, ASIC and SoC applications. It will be recognized that overflow handling capability can be designed with controller 26 in the event that excessive bus latency is experienced.

The front end 13 includes a motion estimation and compensation (MEC) engine 38 having a stream buffer (SB) 40 with a macroblock SRAM 60, discrete cosine transform (DCT) and inverse DCT (IDCT) module 42, buffers such as block SRAMs 41 and 43, a quantizer and dequantizer module 46, and a variable length coding (VLC) encoder 48. The MEC engine 38 and stream buffer 40 will be described below in more detail. The DCT/IDCT module 42 provides block-based orthogonal transformation of a block of picture elements to a matrix of spatial frequency coefficients in order to reduce spatial redundancy, typically after motion compensation prediction or interpolation. By way of example, the internal accuracy of the DCT/IDCT module 42 can be 17 bits, with a DCT output saturated to 8 bits or 12 bits. Two aspects of the DCT/IDCT module 42 are to provide a very small error over the ideal floating model, and to reduce the mis-match of decoding function to be as small as possible. The quantizer/dequantizer module 46 provides further data compression when mapping the data to a representation that strips away unnecessary information, in general, based on zig-zag scans over the macroblock. The macro-block SRAM 60 is a memory device for storing the picture data used by front end 13. Block SRAMs 41 and 43 are shown as separate modules in FIG. 1, but may be part of the same component, and are generally used to store block data at various stages of the encoding process. Where the MEC engine 38 needs to share on-chip SRAM with other modules (e.g., DCT/IDCT 42), a programmable scheduler 21 can be included to coordinate the operation of various modules and processes in system 10.

In FIG. 2, a general block diagram is provided for the DCT/IDCT and quantization and dequantization functionality. Those skilled in the art will recognize that these functions may be provided in a variety of ways. For example, the output of the discrete cosine transform module 42 is quantized. An output of quantizer 46 can be reconstructed through inverse quantizer 42, and provided through inverse DCT 42 for storage in memory, like macro-block SRAM 60 so that it may undergo decompensation. The general purpose of subjecting the output of quantizer 46 through inverse quantization and inverse DCT 42 is to determine a difference macroblock that is lossy. When data is summed with the output of the MEC engine 38 along with dedicated object-based motion prediction tools (not shown) for each object, a lossy version of the original picture can be stored in SRAM 60. Those skilled in the art will appreciate that motion texture coding, DCT-based texture coding (e.g., using either standard 8×8 DCT or shape-adaptive DCT) may also be provided with front end 11. It is noted that DCT/IDCT module 42 and quantizer/dequantizer module 46 not only provide the above functions during the encoding process, but is capable of emulating a decoder for the reconstruction of frames based on receiving the reference frames along with the motion vectors. To this end, the functional blocks 38–48 are capable of operating as a codec.

The VLC encoder 48 provides lossless coding to assign shorter code words to events occurring frequently and longer code words to events occurring less frequently. The use of a VLC is typically useful for reducing the number of bits used during encoding and video compression of motion data. The transform coefficients are quantized and the quantization label encoded using a variable-length coding.

Those skilled in the art will recognize that the blocks of FIG. 1 are functional blocks that may be implemented either by hardware, software, or a combination of both. Given the functional description of these blocks, those of ordinary skill in the art will be able to implement various components described using well-known combinational and/or sequential logic, as well as software without undue experimentation. Those skilled in the art will appreciate that the present invention is not limited to the video compression system described above, but is applicable to any video processing system.

Figure 9:
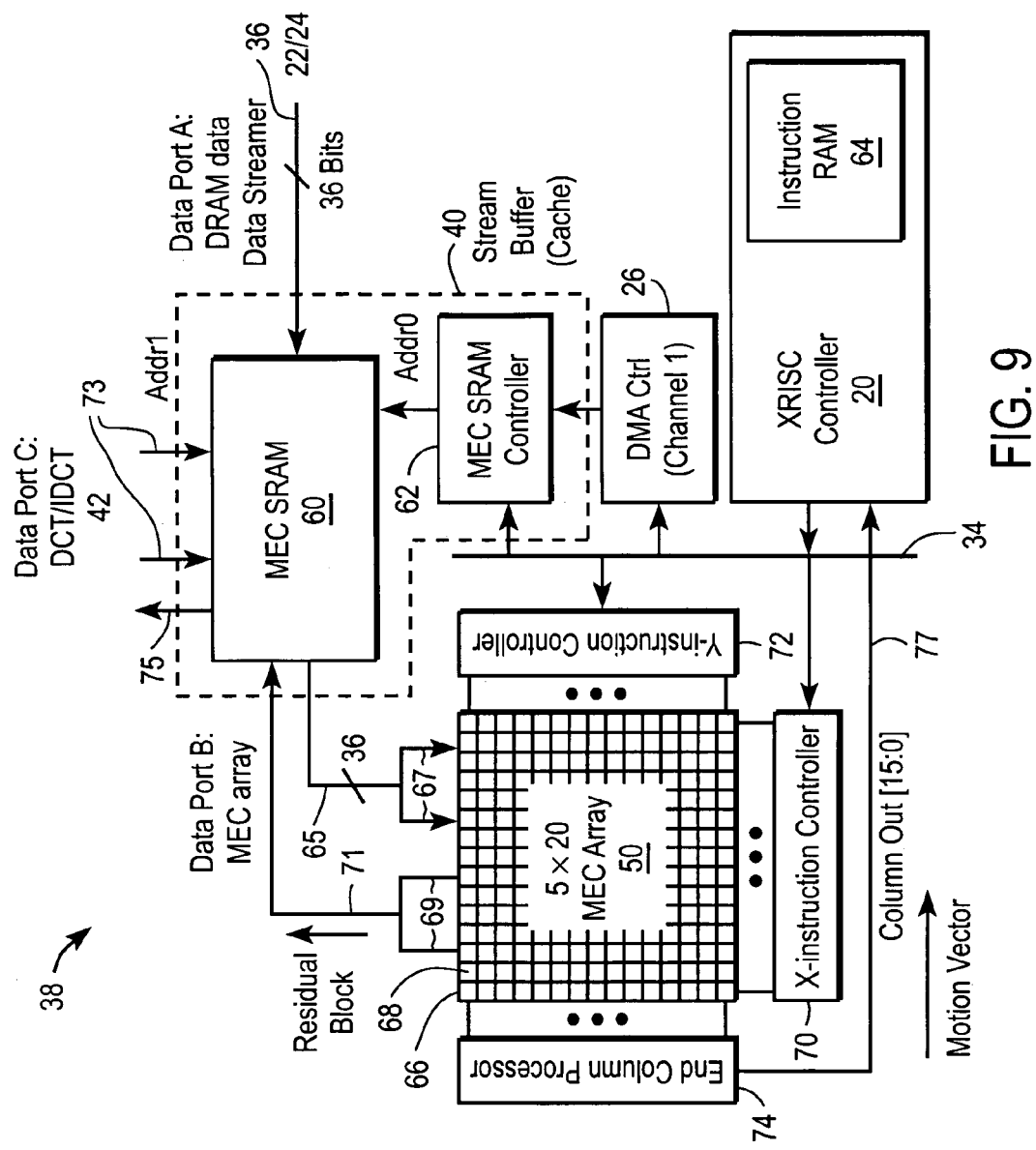
FIG. 9 is a detailed block diagram of a particular embodiment of the motion estimation and compensation (MEC) engine of FIG. 2.

Reference is now made to FIG. 9 to further describe an embodiment of the motion estimation and compensation (MEC) engine 38. In the embodiment of FIG. 9, similar reference numerals are used for common components already described, primarily for convenience. The stream buffer 40 generally functions to manage access requirements from at least three different devices, that is, the MEC cell array 66, the DMA controller 26 and the DCT/IDCT 42. It will be understood by those skilled in the art that the stream buffer 40 will require interfaces in order to communicate with these devices. For example, one interface connects the stream buffer with the DMA controller 26, another interface connects the stream buffer with the DCT/IDCT module 42, and yet another interface connects the stream buffer to the MEC array 66. One aspect of the stream buffer is to buffer the data loaded from the memory device 22 by the controllers 24 and 26. The data generally are organized in block type, wherein the block may include programmable x and y size. The stream buffer 40 will be read/written by the MEC array 66. The read and write instructions are typically burst with a programmable length, from a programmable start address, and by one of several predefined burst modes. It is advantageous to package the sequential data loaded from the memory device 22 to structures required by the MEC array 66 so that the order in which the MEC array 66 reads data can be different from the order in which data are read from the memory device 22.

In the particular embodiment shown in FIG. 9, the stream buffer 40 includes: an SRAM 60 shared by the devices 66, 26 and 42; and a controller 62. SRAM 60 in one embodiment is 36 bits wide with a 1 Kbit word depth, thereby having a 36×1024 bit capacity with single port. Instruction RAM 64 is a storage cell (e.g., RAM, RISC file) that is accessed by the controller 20 for use by the CPU 18. The stream buffer 40 may include a register file that functions as a lookup table for converting all input logic address to its actual physical address. This lookup table can be accessed by the control bus 34. The XRISC controller may be designed to set the lookup table in the stream buffer through the appropriate interface, so that a host device may be able to read and write the SRAM cells through this interface.

The MEC engine 38 includes an MEC array 66 of cells 68. Databus 65 couples the MEC SRAM 60 to array 66, and can be 36 bits wide by way of example. Because array 66 comprises numerous cells 68, the data over bus 36 may be duplicated over lines 67, and received by appropriate cells 68. To facilitate this one-to-many mapping (databus 65 to datalines 67), it will be understood that an instruction may be provided from the XRISC controller 20 to indicate which cells accept (e.g., select) data over datalines 67. Datalines 69 carry the output from the cells 68 of array 66. The types of data that may be transferred from the stream buffer 40 to the MEC array 66 include pixel data, and the residue or predicted data of a matchblock or reference block. The types of data that may be transferred from the MEC array 66 to the stream buffer 40 include the predicted data, residue data, and the reconstructed data of the macroblock. Similarly, an instruction programmed by XRISC controller 20 may be used to select amongst datalines 69 the residual data to be transferred over databus 71. SRAM 60 also has inputs and outputs 73 and 75 (data port C) for communication of the residual information that has been further processed by the DCT/IDCT 42 (and quantizer 46) to finally optimize the compressed video stream.

The MEC array 66 is coupled to two IC controllers, namely an X-instruction controller 70 and a Y-instruction controller 72, as well as to an end column processor 74. X and Y instruction controllers 70 and 72 allow the XRISC controller 20 to configure an instruction set, and can be programmed to receive commands from controller 20. In response, the controllers 70 and 72 can make decisions and provide instructions (e.g., branch, jump) to the cells 68 of array 66. For example, the instructions may be 32-bits in length for the x control, and 24-bits in length for the y control. Each IC controller 70, 72 may include register files (not shown) to store instructions to be executed by the MEC cell array 66. These register files may utilize a handshaking protocol to fetch the instructions, decode them, and send them to array 66 for further execution. Column processor 74 receives data from the column cells 84 (to be described) after the MEC array 66 completes it calculations. Column processor 74 provides further comparison and processing in deciding which match is the best during the motion vector processing to be described, and subsequently outputs the final motion vector along data line 77, which can be read by the XRISC controller 20 and sent to the VLC 48 for encoding, and subsequently to the DRAM 22.

Figure 10:
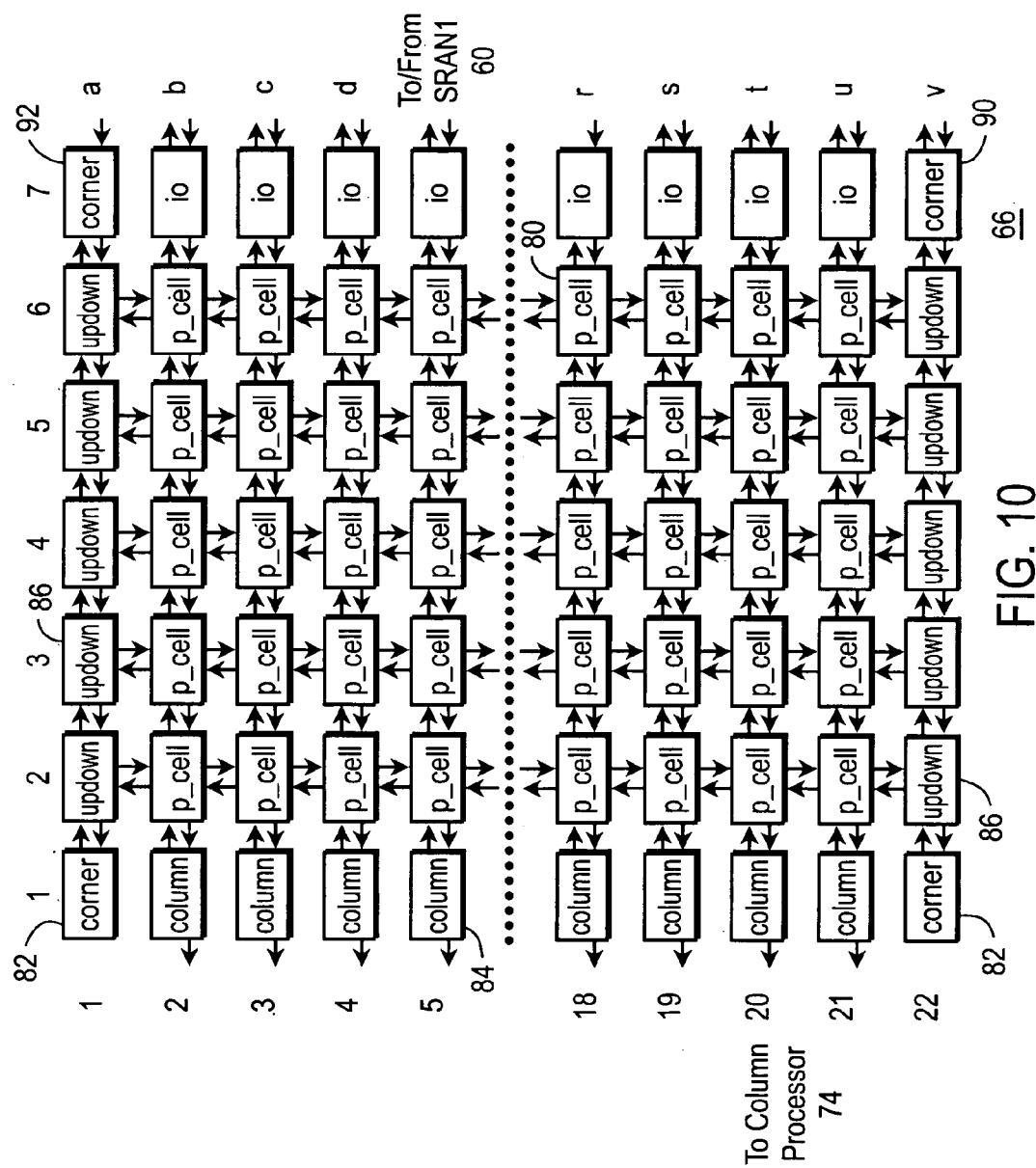
FIG. 10 is a block diagram of a particular embodiment of the cell array for the MEC engine of FIG. 9.

Referring to FIG. 10, one embodiment of the MEC array 66 is shown. The MEC cell array 66 is a processor cell array that includes 7×22=154 cells 68, a portion of which comprises a sub-array 50 (shown in FIG. 9) having 5×20=100 cells, each used for processing (i.e., major computing) and referred to as p_cells 80. MEC array 66 further includes 4 types of boundary cells, namely corner cells 82, column cells 84, updown cells 86 (5 up, 5 down), and io cells 88, which are generally used to store data for use by various components of the MEC engine 38. The interconnections of the p_cells 80 include 4 inputs and 4 outputs so that data can be transferred to each p_cell 80 from a neighboring p_cell 80 in the array 66. One aspect of the present invention is to reduce the complexity of the routing, placement, and layout of logic of the MEC cell array 66. With the embodiment of FIG. 10, this is achieved because each p_cell 80 of the 5×20 sub-array 50 is connected to its neighboring p_cell 80. This simplifies the logic design complexity to providing adjacent interconnections amongst p_cells 80. With a simple layout, placement and routing of logic, manufacturing costs of system 10 are reduced, which is particularly beneficial for SoC and ASIC applications.

The interconnections of corner cells 82, 90 and 92 include an input and an output from an adjacent horizontal updown cell 86. The two corner cells 90 and 92 each accept data inputs from the SRAM 60. The interconnections of the columns cells 84 include an input and output to an adjacent horizontal p_cell 80, and an output to the end column processor 74. The interconnections of the updown cells 86 include an input and output to an adjacent vertical p_cell 80 and two inputs and two outputs to adjacent horizontal cells, which may be two updown cells 86 or a combination of an updown cell 86 and a corner cell 82. The interconnections of an io cell 88 include two pairs of inputs and outputs, one for an adjacent horizontal p_cell 80, and the other for communication with the SRAM 60.

Each p_cell 80 can hold several groups of Q pixels for a block. The reference to Q will be described subsequently in more detail. In one embodiment in accordance with the present invention, the p_cell 80 can hold up to Q×3 pixels, including Q pixels from the reference block, Q pixels from the matchblock, and Q pixels from the predicted data. By way of example, if Q=4, then p_cell 80 can hold 12 pixels, comprising 4 continuous pixels in a row of reference data, 4 pixels of matchblock data, and 4 pixels from the prediction (or residue or reconstructed) data. The p_cell 80 should also be enabled to perform local calculation, as well as concurrently allow data to be moved to another cell. Furthermore, the p_cell 80 can hold an instruction combined with x-control and a y-control information as will be described in FIG. 10. In this particular implementation of FIG. 10, the p_cells 80 collectively can hold 20×20 pixels, since each cell can hold 4 pixels for a block. However, with the addition of the boundary cells 82, 84, 86, and 88, array 66 can hold 22×22 pixels, the significance of which will become apparent from the subsequent discussion.

In particular, io cells 88 enable the input and output of data between SRAM 60 and sub-array 50. For example, the io cells 88 receive image data from the SRAM 60 over datalines 67, and output residual data to the SRAM 60 over datalines 69. Corner cells 82, 90, 92, updown cells 86, column cells 84, and io cells 88 provide boundary storage, which enables data storage when a block of data in the sub-array 50 moves outside of the boundaries of array 66. For example, if data that is moved upwards from the p_cells 80 toward the updown cells 86 are not stored in the updown cells 86, it will be lost. By storing data that moves outside of the boundaries (up, down, left, right) of array 66 in these boundary cells, such data can be readily obtained when the previously-moved data re-enters the boundary. Those skilled in the art will appreciate that the accumulation and computational functionality of boundary cells 82, 84, 86, 88, 90 and 92 can be implemented in a variety of ways with conventionally known logic. The boundary cells are further beneficial for increasing the overall memory of the array formed by the p_cells 80, which is particularly useful for processing a very large frame. Corner cells 82, 90 and 92 provide further memory storage when pixels are moved up, down, left and right.

In accordance with one embodiment of the present invention, MEC engine 38 interfaces with an external DRAM 22 to obtain picture data and to store processed picture data over databus 36. Picture data read from the DRAM 22 is received by the io cells 88 from the SRAM 60 controlled by SRAM controller 62. This is generally referred to as pre-loading the data. The io cells 88 can shift the data received to the sub-array 50 of p_cells 80 for processing. The array 66 is enabled to perform calculations on the data received from the io cells 80, and because stream buffer 40 functions as a programmable cache, contemporaneous with such array processing, additional data can be pre-loaded from DRAM 22 into the SRAM 60 for the next set of processing operations. Stream buffer 40 thus enables the MEC array 66 to process data and when the array 66 is not accessing the stream buffer 40, the stream buffer can pre-fetch data from the memory device 22 for the next MEC operations in parallel. This parallel processing capability helps to improve the efficiency and speed of the MEC engine 38. Furthermore, data that is used more than one time by the MEC cell array 66 can be stored in the stream buffer thereby avoiding the need for the memory controllers 24, 26 to load them again from the memory device 22.

Figure 11A:
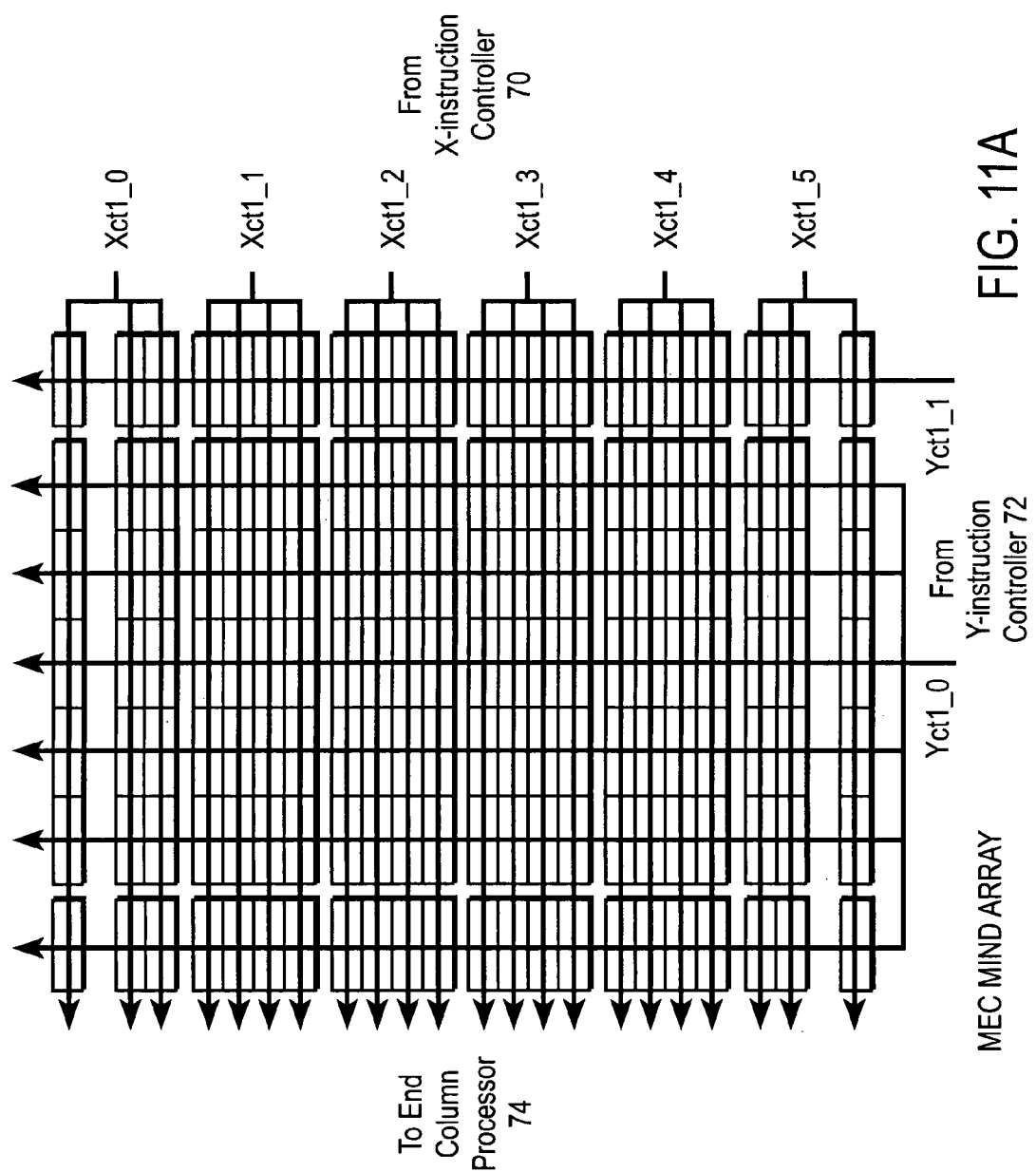
FIG. 11A is a data flow diagram of a particular implementation of control signals for the MEC cell array according to an MIMD arrangement.

FIG. 11A shows an implementation of the instruction signal distribution for controlling the MEC array 66. X-instruction controller 70 and Y-instruction controller 72 each receive respective control signals over bus 34 from the XRISC controller as shown in FIG. 9. The X-instruction controller 70 provides x coordinate control signals to array 66 over lines labeled Xctl_0, Xctl_1, Xctl_2, Xctl_3, Xctl_4, and Xctl_5 as seen in FIG. 11A. The Y-instruction controller 72 provides y coordinate control signals to array 66 over lines labeled Yctl_0 and Yctl_1. For example, to provide x coordinate control, 14 bits may be used, and to provide y coordinate control, 21 bits may be used. It will be understood by those skilled in the art that there are a variety of ways to allocate the bits of the control signals to each of the lines Xctl_0 through Yctl_1. The particular implementation of FIG. 11A is representative of a Multiple Instruction stream Multiple Data stream (MIMD) architecture that enables multiple cells 68 to each process its own set of control instructions simultaneously and independently of others. For example, in an MIMD cell array 66, each p_cell 80 can hold different data and be controlled by different instructions. In order to distribute different instructions from the control bus 34 to different p_cells 80, the present invention separates an instruction into 2 parts, namely x and y. Each part provides partial control of the p_cell 80. That is, for x-coordinate control, each row of cell array 66 receives the same x instruction. Moreover, different rows of p_cells 80 may have different x-instructions, or several rows of p_cells may receive the same x instruction. While cells 68 of a row may have the same x instruction, each p_cell 80 in the row receives different y coordinate instruction control. When combining the x and y control in this manner, each cell 68 of array 66 is capable of processing different instructions.

Figure 11B:
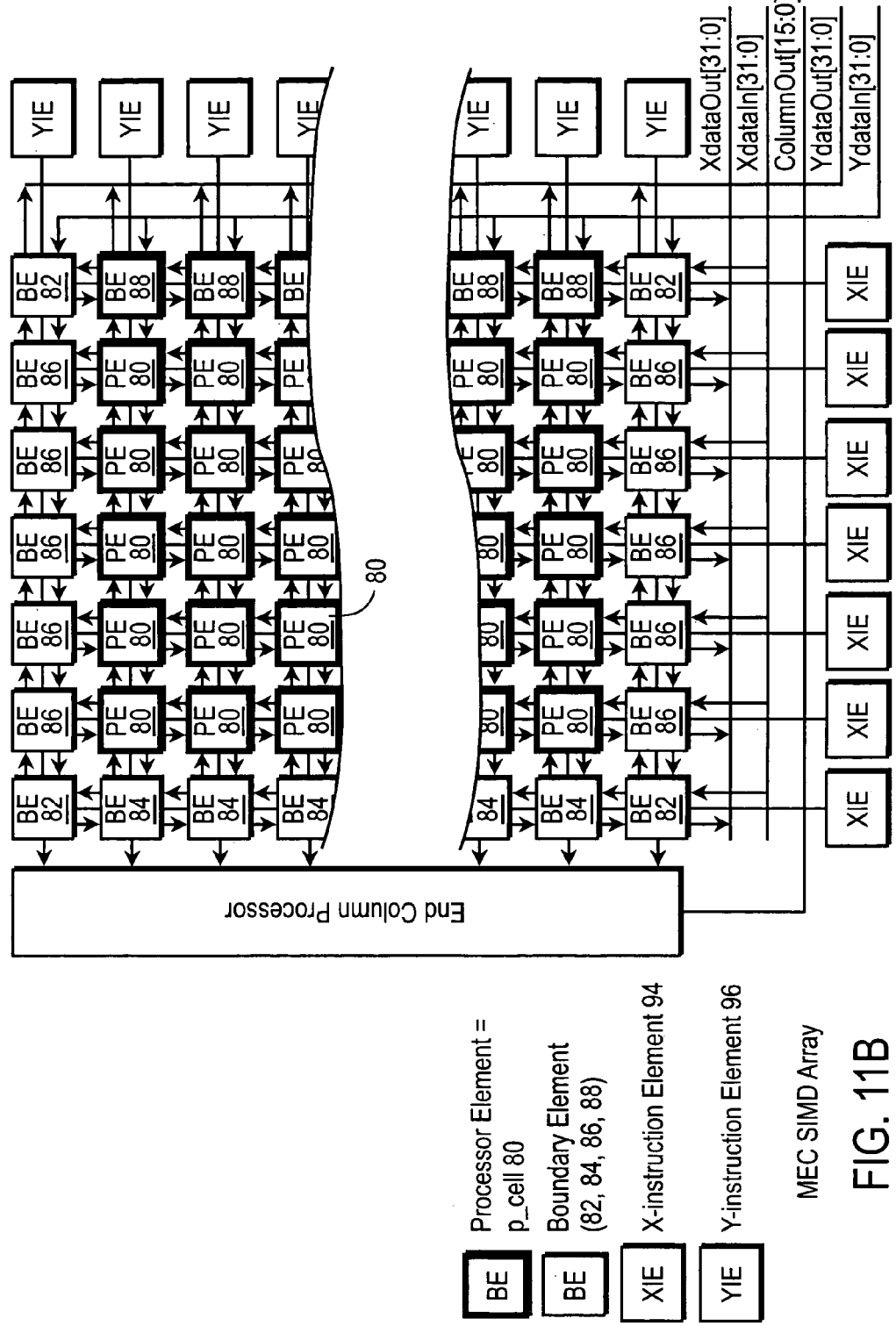
FIG. 11B is a data flow diagram of an alternate implementation of control signals for the MEC cell array according to an SIMD arrangement.

Referring to FIG. 11B, in an alternate embodiment, a Single Instruction stream Multiple Data stream (SIMD) architecture works suitably well with the present invention. With the SIMD architecture, instructions are issued for each operation. Accordingly, instruction controllers 70 and 72 are not required. Rather, the XRISC controller 20 generates WRITE instructions each cycle which pass through x and y instruction elements 94, 96 for operating the processing in the MEC array 66. The SIMD architecture is suited to handle hundreds of instructions issued at the same clock to different cells of the array 66. For example, in the same row of cells 68, the same x coordinate instructions are received, yet each cell 68 of the row receives a different y coordinate instruction. Each successive row is provided with separate instructions for each cell 68. The tradeoff with the SIMD embodiment is an increased number of instructions, resulting in longer program cycles to achieve the similar results obtained by the MIMD embodiment of FIG. 11A. By contrast to the MIMD implementation, the SIMD implementation adds processing burden to the XRISC CPU 18. In order to avoid this situation, the separate instruction controllers 70 and 72 are introduced to issue the instructions to the array 66. Because the embodiment using the MIMD architecture utilizes fewer number of cycles to perform the parallel processing, it is the preferable implementation as it results in the overall speed for video compression being improved.

Video compression applied between pictures is facilitated by a process of motion estimation and compensation, wherein a motion vector and difference data is used to specify the translation of a set of picture elements (pels) amongst other pels. The motion estimation technique results in the generation of a motion (estimation) vector (mv). Images of the $i^{th}$ picture and the $i+1^{th}$ picture are processed by an encoder to determine motion vectors which are the basis for which the $i+1^{th}$ and subsequent pictures are encoded for transmission or storage. The bitmaps of the input image are received by the MEC engine 38 in order to derive motion vectors associated with the macroblock data from reference and/or future (subsequent) pictures.

A motion vector is associated with a matchblock, and represents the relative coordinates in a search area of a reference frame at which a particular matchblock of the current frame may be found. The motion vector indicates the relative two-dimensional translation that the image in the matchblock has undergone relative to its coordinates in the reference block. For example, if a motion vector (−3,3) for the a matchblock is located at the coordinates (24, 20) in the current frame, then the corresponding image in the search area of the reference frame is found by moving three pixels to the left and three pixels down in the reference frame. Accordingly, the image is located at (21, 23) in the reference frame.

In block-based motion compensation, a frame of interest being encoded is divided into block of size M×M. The motion vector for each matchblock in the current frame is calculated by correlating the matchblock with a corresponding search area in the reference frame. That is, for each block, a search of the previous reconstructed frame is done for the block of size M×M that most closely matches the block being encoded. For example, an 8×8 matchblock may be scanned pixel-by-pixel relative to a 20×20 search area in the reference frame. This process can be analogized to having the matchblock overlaid at an initial position within the search area of the reference frame. A matchblock/search area correlation error between the pixel intensity values of the matchblock and the overlaid search area can then be determined. Several techniques may be employed to determine the error measurement therebetween, for example, the mean absolute error or the mean square error. An exhaustive search is typically then performed wherein the matchblock may then be moved one pixel horizontally or vertically within the search area of the reference frame, so that the error at that position can be calculated. This process continues until the error between the matchblock and the search area has been calculated for every position within the search area. A minimum error for all positions is indicative of the highest correlation between the matchblock of the current frame and the search area of the reference frame. The x- and y-coordinate translation of the position of the search area associated with the minimum error is selected as the motion vector for the corresponding matchblock. As such, the term "motion vector" may generally refer to any x and y coordinate translation vector for the search area. When the encoder transmits the reference frame, instead of transmitting subsequent frames, the motion vectors can be transmitted thereby to save time and bandwidth, at least until another reference frame of a source image must be transmitted. Thereafter, motion vectors may be transmitted as before.

Referring back to FIG. 2, the overall operation of the DCT/IDCT module 42 will now be described. A general dataflow of the front end 13 will now be described. In a first direction, data flows generally from the MEC engine 38 to the DCT module 42 and to the quantizer 46. In a second direction, data flows from inverse quantizer 46 to IDCT module 42 and to the MEC engine 38 for decompression. In the first direction, SRAM 60 used as exchange block between DCT module 42 and the MEC engine 38. After motion estimation and compensation, the residue block is transferred to SRAM 60 to await DCT processing by the DCT module 42. The data block is loaded into DCT module 46, and once DCT is completed, the processed information is stored in SRAM 41, awaiting transfer to quantizer 46. The data block is loaded into quantizer 46, and once quantization is complete, the datablock is transferred to SRAM 43. In the second direction, the datablock from the dequantizer 46 is written from SRAM 43 to IDCT module 42. Once IDCT processing is complete, the datablock gets transferred to SRAM 60 awaiting decompensation by MEC engine 38.

More details of a particular implementation of the data flow are discussed below. For illustrative purposes in the discussion to follow, reference will be made to a 100-word data block and to 100-word data blocks being stored in the macroblock SRAM 60 and block SRAMs 41 and 43. Those of skill in the art will appreciate that the present invention is not limited to 100-word data blocks nor to SRAMs 41, 43 and 60 being of 100-word capacity, and that any size datablock and SRAMs may work suitably well with the present invention. Additionally, reference will be made to module 42 without specific indication of the DCT or IDCT functions being performed. Occasionally though, reference to the DCT/IDCT module 42 will be made interchangeably: to DCT module 42 when the context indicates that the DCT function is being performed; and to IDCT module 42 when the context indicates that the IDCT function is being performed.

Figure 3:
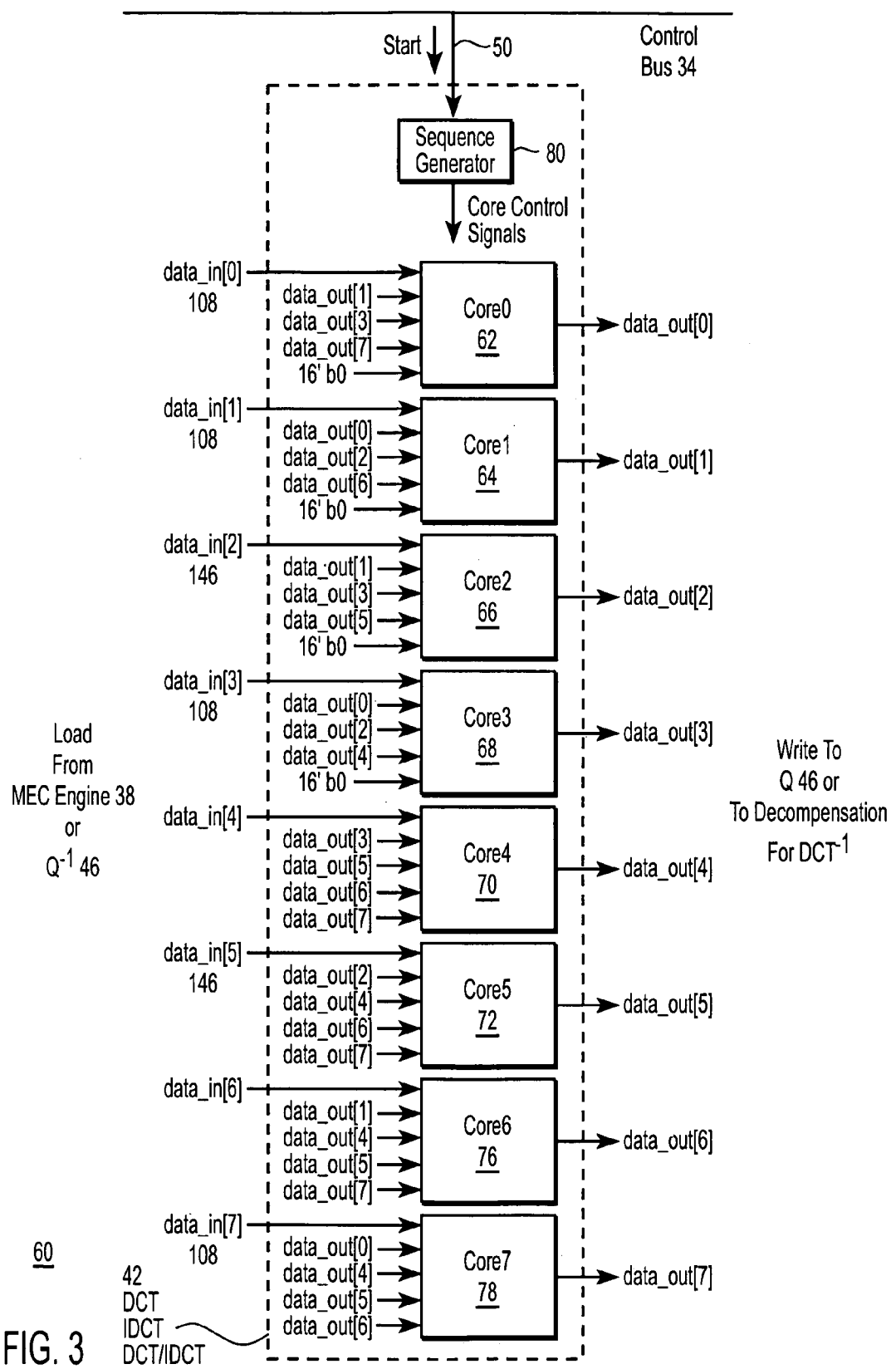
FIG. 3 is a block diagram of a particular embodiment of the DCT/IDCT module of FIG. 1 having a plurality of cores in accordance with the present invention.

The MEC engine 38 is designed to WRITE an original macroblock to SRAM 60 while performing motion prediction. After the MEC engine 38 fills the 100-word buffer of SRAM 60, the MEC engine 38 generates a scheduling command to invoke the DCT module 42. In FIG. 3, this scheduling command may be analogized to a "start" sequence command, which is received by sequence generator 80 from control bus 34. In response, various control signals are generated by sequence generator 80 within the module 42, as will be described subsequently in further detail. The DCT module 42 can copy the words stored in SRAM 60 to another buffer, namely SRAM 41, which like SRAM 43 may have memory capacity to store 100 words. The copying is done typically because the module 42 is busy with its DCT or IDCT processing for each macroblock. After the DCT module 42 completes the data copy from the macroblock SRAM 60 to block SRAM 41, the module 42 will copy the reconstructed IDCT results back from the block SRAM 43 to the macroblock SRAM 60 for subsequent loading into MEC engine 38 for decompensation. This data includes the IDCT results in the last macroblock round.

After the copy process for these two blocks of data is completed, the DCT module 42 fetches data from the block SRAM 43, in either pixel_even or pixel_odd form depending on a status register bit in the (IDCT) module 42. This data will be used as source data for the IDCT transform. When IDCT results become available, the IDCT module 42 will write the IDCT results to the block SRAM 60. When the IDCT transform is completed, the DCT module 42 fetches data from the block SRAM 41, performs the DCT transform, and writes the DCT results back to the block SRAM 41, pixel_even or pixel_odd depending on the same status bit.

When the DCT module 42 is reading 100-word data from the macroblock SRAM 60, it will use the block SRAM 41 as a temporary storage. This data is actually the source data for the DCT module 42 to perform the DCT calculation. Subsequently, when module 42 begins to perform DCT transform calculations, it will read the data stored temporarily in block SRAM 41. Accordingly, the 100-words storage in the block SRAM 41 is logically the DCT input buffer in block SRAM 41. While module 42 is performing two-dimensional DCT, it will store transformed DCT results in the block SRAM 41. These results will be used by the quantizer module 46 in the next macroblock round.

The dequantizer module 46 will transfer its dequantized results to the block SRAM 43 so as to serve as the source data for IDCT transform. Hence, when the IDCT module 42 is performing the IDCT function, it reads this data, performs the IDCT process and then writes the IDCT results to the block SRAM 60. The IDCT processed datablock then gets read into MEC engine 38 for decompensation.

Referring to FIG. 3, additional details of module 42 will now be discussed. In the particular embodiment of FIG. 3, module 42 includes eight cores, namely core0 ("core 62"), core1 ("core 64"), core2 ("core 66"), core3 ("core 68"), core 4 ("core 70"), core5 ("core 72"), core6 ("core 76") and core7 ("core 78"). Each core receives data (data_in[ ]), which is loaded from either the MEC engine 38 or from the dequantizer module 46 through a corresponding memory buffer, either macroblock SRAM 60, block SRAM 41, or block SRAM 43. Each core has a respective output (data_out[ ]) where the DCT module 42 WRITES data to quantizer module 46 and the IDCT module 42 WRITES data to MEC engine 38 for decompensation after IDCT. The eight cores can be classified into one of four types, and more details of each core type will be described subsequently.

The total internal data bandwidth of module 42 is 17-bits, comprising 16 bits of data and 1 sign bit. This internal 17-bit total bandwidth enables a higher precision of results for multiplication and addition operations, thereby resulting in improved quality of the DCT and IDCT calculations, as opposed to conventional approaches which use 12-bit internal (DCT) precision. For example, besides the data_in[ ] signal to a respective core, up to four feedback signals selected from various output signals (data_out[ ]) are provided back to the input of each core. The reference to $16'b0$ represents a sufficient number of padded zeros acting as "don't cares" to fill the 16-bit data input (absolute value), in particular for those cores which do not have four feedback signals from the output data (data_out[ ]) of a combination of cores, as illustrated in FIG. 3. Additionally, module 42 includes a sequence generator 80, which receives control signals from the XRISC controller 20 over control bus 34, and in turn generates core control signals, regport[0:1], mod, mul, seq, read, and table, as will be described subsequently.

Figure 4:
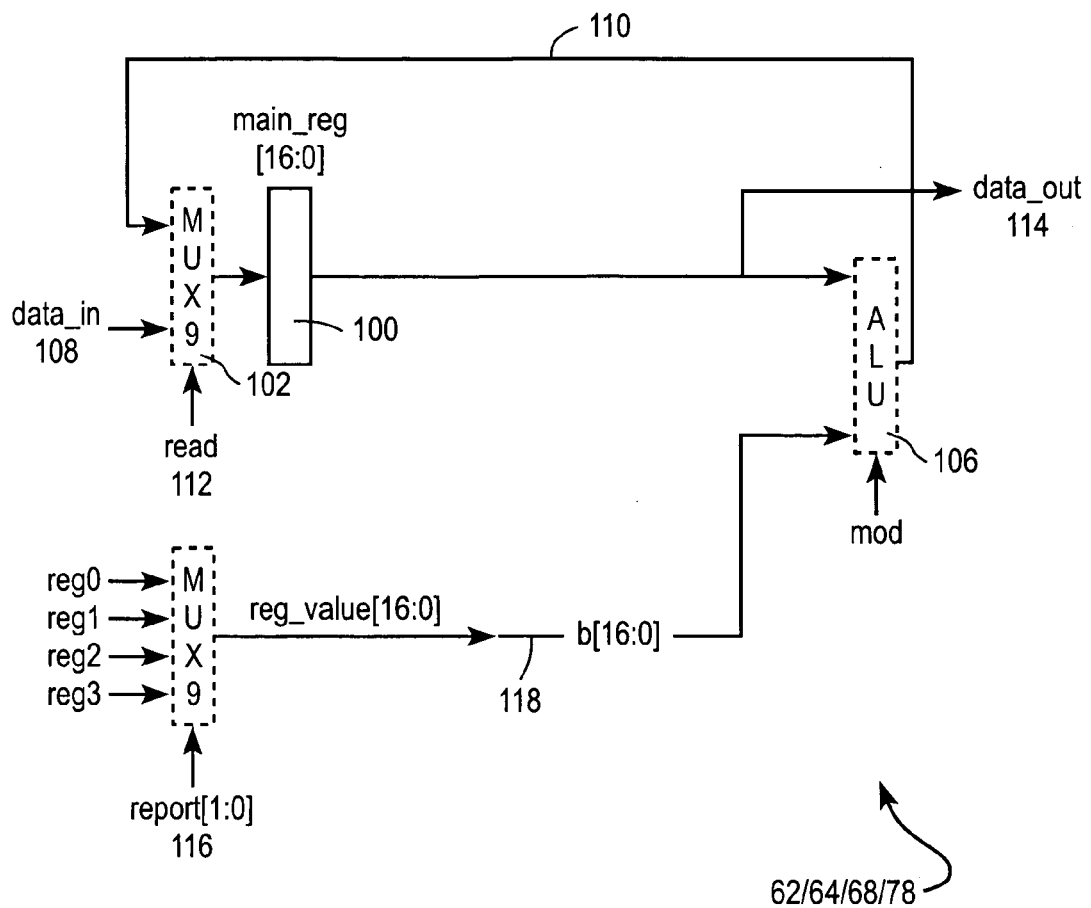
FIG. 4 is a detailed block diagram of one embodiment of a first type of core in accordance with the present invention.

Referring to FIG. 4, type 1 cores are shown and have the simplest design. Type 1 cores include core 62, core 64, core 68 and core 78. Each of these cores includes a main register 100, a first multiplexer 102, a second multiplexer 104, and an arithmetic logic unit (ALU) 106. Main register 100 is 17 bits wide and receives data from multiplexer 102, which selects input data from either incoming data (data_in[ ]) 108 or from feedback data 110 provided by the ALU 106, depending upon whether the READ signal 112 is selected. For example, if READ=0, then feedback data 110 is selected, else if READ=1, then input data 108 is received.

Referring to FIG. 3, it will become apparent from this discussion that data_in 108 corresponds to data_in[0] for core 62, data_in[1] for core 64, data_in[3] for core 68, and data_in[6] for core 76. Similarly, data_out 114 transmits either data_in 108 or feedback data 110, whichever multiplexer 102 selects. In FIG. 3, it will become apparent from the discussion that data_out 114 corresponds to data_out[0] for core 62, data_out[1] for core 64, data_out[3] for core 68, and data_out[6] for core 76. Feedback data 110 is determined from the ALU 106 based on a combination of control signals, mod and regport[1:0]. Tables 1–2 show exemplary values of regport[1:0] used to select one of the four feedback signals referenced as reg0, reg1, reg2 and reg3. For example, regport[0,0] selects reg0, regport[0,1] selects reg1, regport[1,0] selects reg2, and regport[1,1] selects reg3. When the mode control signal (mod)=1, the ALU 106 will perform a mode operation upon the selected feedback signal 118 with the signal appearing on data_out 114 in order to carry over the remainder of mathematical operation. The mode operation comprises two states: SATURATION (mod=0) and CUT (mod=1). CUT mode restricts a result value to a range, for example, when the resultant is larger than 17 bits. In accordance with the present invention, this situation may arise because the output of module 42 is 32 bits. The DCT output required by MPEG-1 is 8-bits, whereas the DCT output required by MPEG-2 is up to 12-bits. Given that the 17-bit output of module 42 may be too high for these video compression standards, the CUT mode enables the DCT output of the present invention to be reduced to the highest 8 or 12 bits, by way of example. The use of the SATURATION mode may arise when the DCT output is larger than expected. Thus, SATURATION mode keeps the maximum value allowed for the DCT result, which is beneficial when such output exceeds a maximum limit.

TABLE 1

Control Signals of Core 62 and Core 64

| | CORE 62 | | CORE 64 | |
|---|---|---|---|---|
| Clock | regport [1:0] | mod | regport [1:0] | mod |
| clk1 | 10 | 1 | 10 | 1 |
| clk2 | 00 | 1 | 00 | 1 |
| clk3 | 00 | 0 | 01 | 0 |
| clk4 | 01 | 1 | 01 | 1 |
| clk5 | 00 | 0 | 00 | 1 |
| clk6 | 00 | 0 | 00 | 0 |
| clk7 | 01 | 0 | 00 | 0 |

TABLE 2

Control Signals of Core 68 and Core 78

| | CORE 68 | | CORE 78 | |
|---|---|---|---|---|
| Clock | regport [1:0] | mod | regport [1:0] | mod |
| clk1 | 10 | 1 | 10 | 1 |
| clk2 | 00 | 0 | 01 | 1 |
| clk3 | 00 | 0 | 00 | 0 |
| clk4 | 00 | 1 | 10 | 1 |
| clk5 | 01 | 1 | 11 | 1 |
| clk6 | 00 | 0 | 00 | 0 |
| clk7 | 01 | 0 | 11 | 0 |

Figure 5:
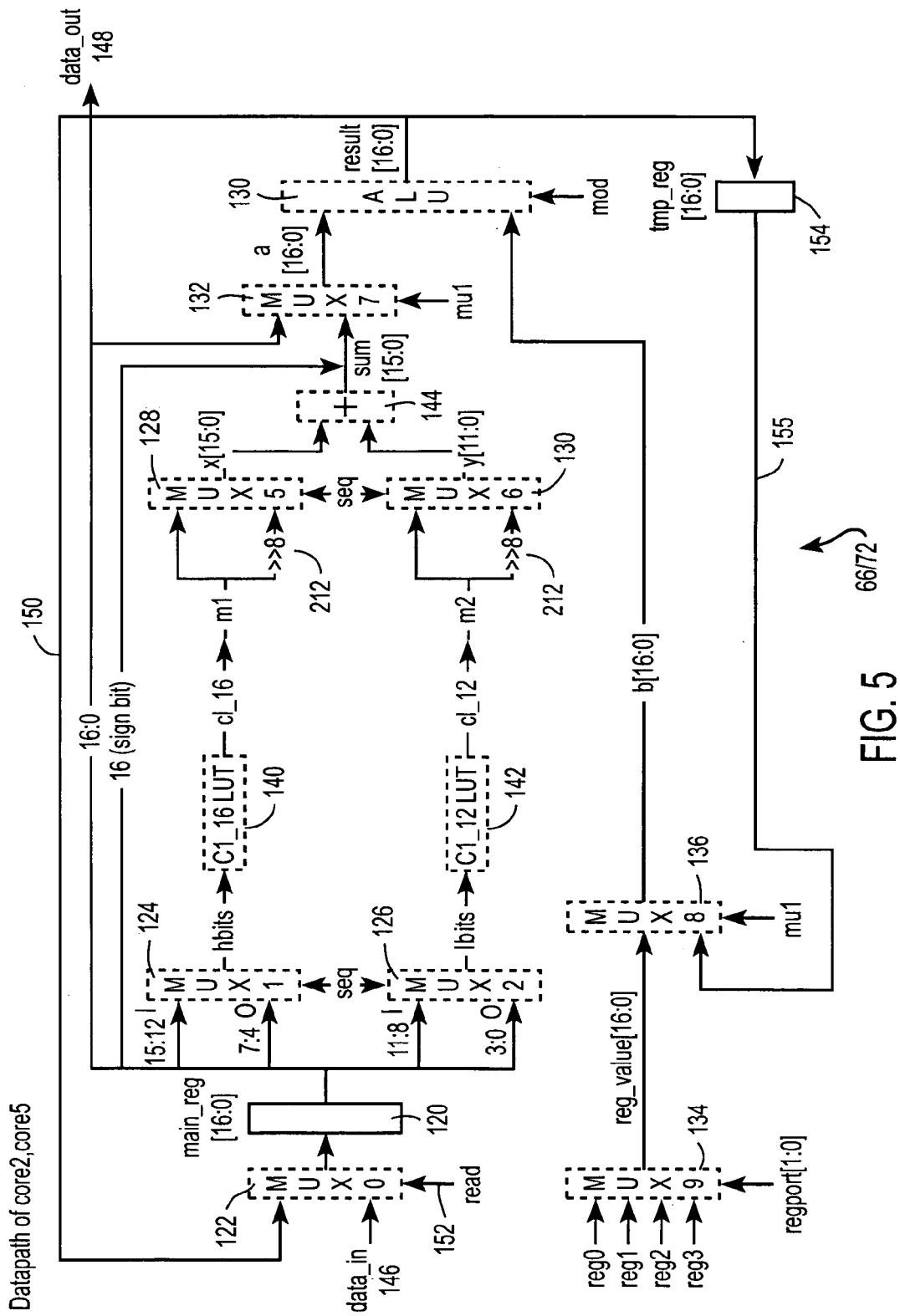
FIG. 5 is a detailed block diagram of one embodiment of a second type of core in accordance with the present invention.

Referring to FIG. 5, type 2 cores are shown with a pair of lookup tables, C1_16 and C1_12. Type 2 cores include core 66 and core 72. Each of these cores includes a main register 120, seven multiplexers 122, 124, 126, 128, 130, 132, 134, and 136, an ALU 138, two lookup tables 140, 142, and an adder 144. Main register 120 is 17-bits wide (includes sign bit) and receives data from multiplexer 102, selected either from incoming data (data_in) 146 or from feedback data 150 provided by the ALU 130, depending upon whether the READ signal 152 is selected. For example, if READ=0, then feedback data 150 is selected by multiplexer 122, else if READ=1, then input data 146 is selected. Cores 66 and 72 further includes a temporary register 154, which accepts feedback from ALU 130 and outputs the feedback data 155 to multiplexer 136. The intermediate value (as described subsequently as $V_i$ as in Eq. (4)) is stored in the temporary register 154.

Multiplexer 136 selects either the feedback data 155 ($V_i$) or a feedback (data_out) signal selected from the four other cores, as designated by reg0, reg1, reg2, and reg3. It will become evident from the present description that: for core 66, reg0 is data_out[1], reg1 is data_out[3], reg2 is data_out[5], and reg3 is 16′b0; for core 72, reg0 is data_out[2], reg1 is data_out[4], reg2 is data_out[6], and reg3 is data_out[7]. The control signals to regport[1:0] are used to select one of the four feedback data_out signals referenced as reg0, reg1, reg2 and reg3. These values are shown in Table 3.

TABLE 3

Control Signals of Core 66 and Core 72

| | CORE 66 | | | | CORE 72 | | | |
|---|---|---|---|---|---|---|---|---|
| Clock | regport [1:0] | mod | mul | seq | regport [1:0] | mod | mul | seq |
| Clk1 | 10 | 1 | 0 | 0 | 00 | 1 | 0 | 0 |
| Clk2 | 00 | 1 | 0 | 0 | 00 | 0 | 1 | 1 |
| Clk3 | 00 | 0 | 0 | 0 | 00 | 0 | 1 | 0 |
| Clk4 | 00 | 1 | 0 | 0 | 11 | 1 | 0 | 0 |
| Clk5 | 00 | 0 | 1 | 1 | 01 | 1 | 0 | 0 |
| Clk6 | 00 | 0 | 1 | 0 | 00 | 0 | 0 | 0 |
| Clk7 | 01 | 0 | 0 | 0 | 01 | 0 | 0 | 0 |

Feedback data 150 is determined from the ALU 130 based on a combination of control signals, namely mod, mul, seq, and regport[1:0]. It is noted that the two operands for the ALU 130 and the final result output from the ALU are all in the sign bit+absolute value format. The reason for this is that although multiplication can occur with positive and negative values, the LUTs store the absolute value of the result.

One approach to accommodating this format will now be described. Within an ALU 130, the operands may be converted into the "2's complementary" format. Subsequently, these operands can be summed using a fast carry look-ahead adder. After the addition operation is completed, the result may be sent to an accuracy control unit, where it is CUT or SATURATED, according to the mod signal. Thereafter, the result can be converted back to the "sign bit+absolute value" format.

Table 3 show the values of these control signals. For example, the mod signal indicates a CUT or SATURATION mode as previously described. A mul signal indicates a multiply or no-multiply mode. A seq signal indicates a sequence mode. When the control signal mod=1, the ALU 130 will perform a CUT mode operation upon the output of multiplexeers 132 and 136. When mod=0, the ALU 130 will perform a SATURATION mode operation.

When the value of the control signal, seq=1, multiplexer 124 selects either the high 4 bits of the high byte of the output of the main register 120, or the high 4 bits of the low byte of the output of the main register 120. When the value of the control signal, seq=0, multiplexer 126 selects either the low 4 bits of the high byte of the output of the main register 120, or the low 4 bits of the low byte of the output of the main register 120.

Cores 66 and 72 further include two lookup tables (LUTs), namely LUT 140 and LUT 142, both of which can be simultaneously used in the DCT and IDCT processing. LUT 140 is a 16-bit table, while LUT 142 is a 12-bit table, as seen in Table 4. The general process for performing the multiplication and addition will be described subsequently with respect to FIGS. 8A–8B.

TABLE 4

Values Stored in LUT for Core 66 and Core 72

| Cores 66 and 72 | |
|---|---|
| LUT C1_16 | LUT C1_12 |
| 0 | 0 |
| b50 | b5 |
| 16a1 | 16a |
| 21f1 | 21f |

TABLE 4-continued

Values Stored in LUT for Core 66 and Core 72

Cores 66 and 72

| LUT<br>C1_16 | LUT<br>C1_12 |
|---|---|
| 2d41 | 2d4 |
| 3892 | 389 |
| 43f2 | 43e |
| 4f32 | 4f3 |
| 5a82 | 5a8 |
| 65d3 | 65d |
| 7123 | 712 |
| 7c73 | 7c7 |
| 87c4 | 87c |
| 9314 | 931 |
| 9e64 | 9e6 |
| a9b5 | a9b |

Figure 6:
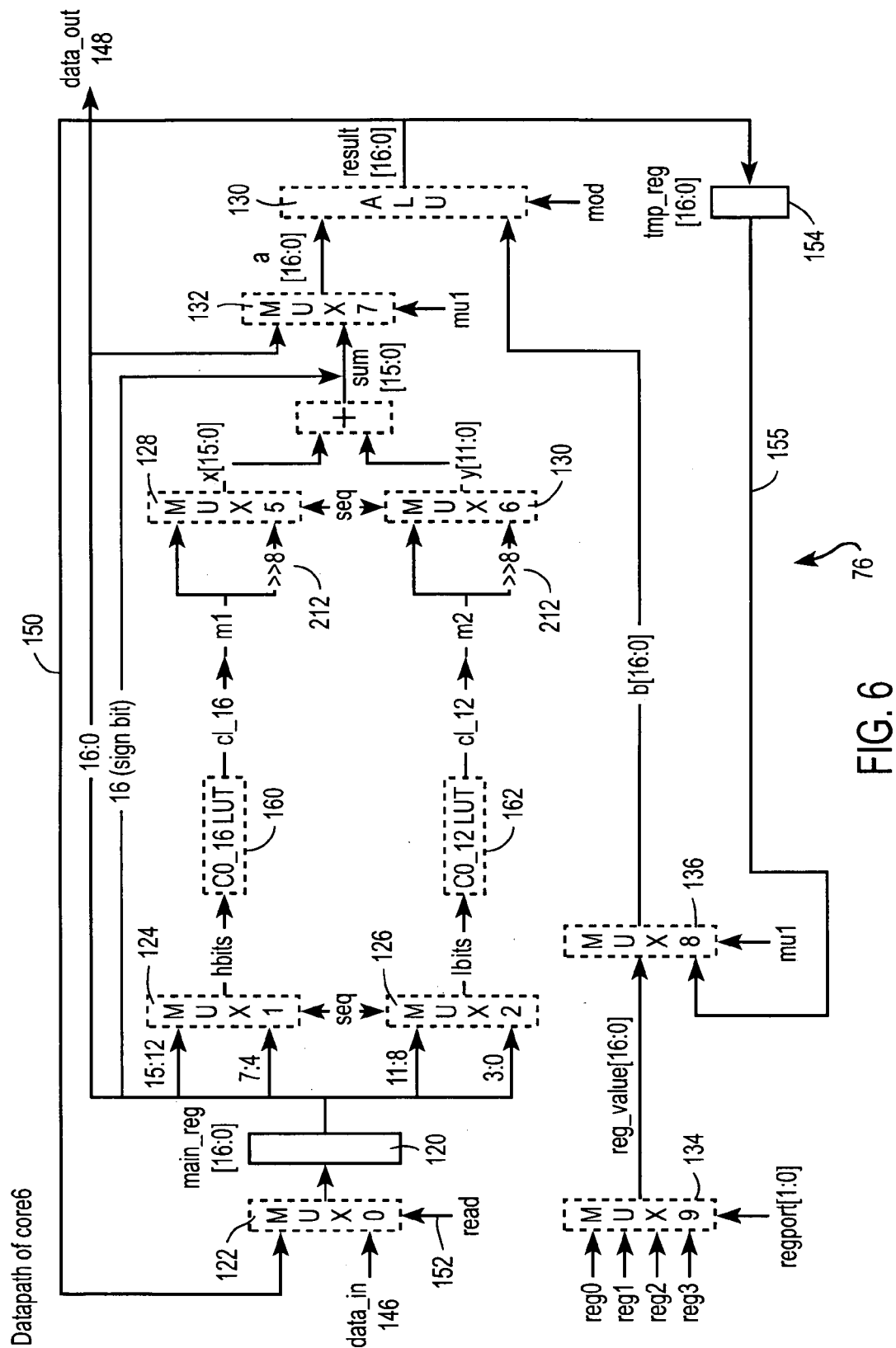
FIG. 6 is a detailed block diagram of one embodiment of a third type of core in accordance with the present invention.

Referring to FIG. 6, a type 3 core is shown with a pair of lookup tables 160 (C0_16) and 162 (C0_12). The type 3 core of FIG. 6 is core 76 shown in FIG. 3. The operation of the type 3 core is similar to the type 2 core, except for the different LUTs 160, 162. Accordingly, reference is made to the previous discussion of the type 2 core to describe the operation of the type 3 core. To this end, similar reference numbers have been used in FIGS. 5–6, primarily for convenience. Table 5 lists the control signals that may be used to operate the core 76.

TABLE 5

Control Signals of Core 76

| Clock | regport<br>[1:0] | mod | mul | seq |
|---|---|---|---|---|
| clk1 | 00 | 1 | 0 | 0 |
| clk2 | 10 | 1 | 0 | 0 |
| clk3 | 00 | 0 | 0 | 0 |
| clk4 | 10 | 1 | 0 | 0 |
| clk5 | 00 | 0 | 1 | 1 |
| clk6 | 00 | 0 | 1 | 0 |
| clk7 | 11 | 0 | 0 | 0 |

Table 6 lists those results that may be stored in the LUTs 160 and 162 to perform the DCT and IDCT functions.

TABLE 6

Value Stored in LookUp Tables (LUT) for Core 76

| LUT<br>C0_16 | LUT<br>C0_12 |
|---|---|
| 0 | 0 |
| ec8 | ed |
| 1d90 | 1d9 |
| 2c59 | 2c6 |
| 3b21 | 3b2 |
| 49e9 | 49f |
| 58b1 | 58b |
| 6879 | 678 |
| 7642 | 764 |
| 850a | 851 |
| 93d2 | 93d |
| a29a | a2a |
| b163 | b16 |
| c02b | c03 |
| cef3 | Cef |
| ddbb | Ddc |

Figure 7:
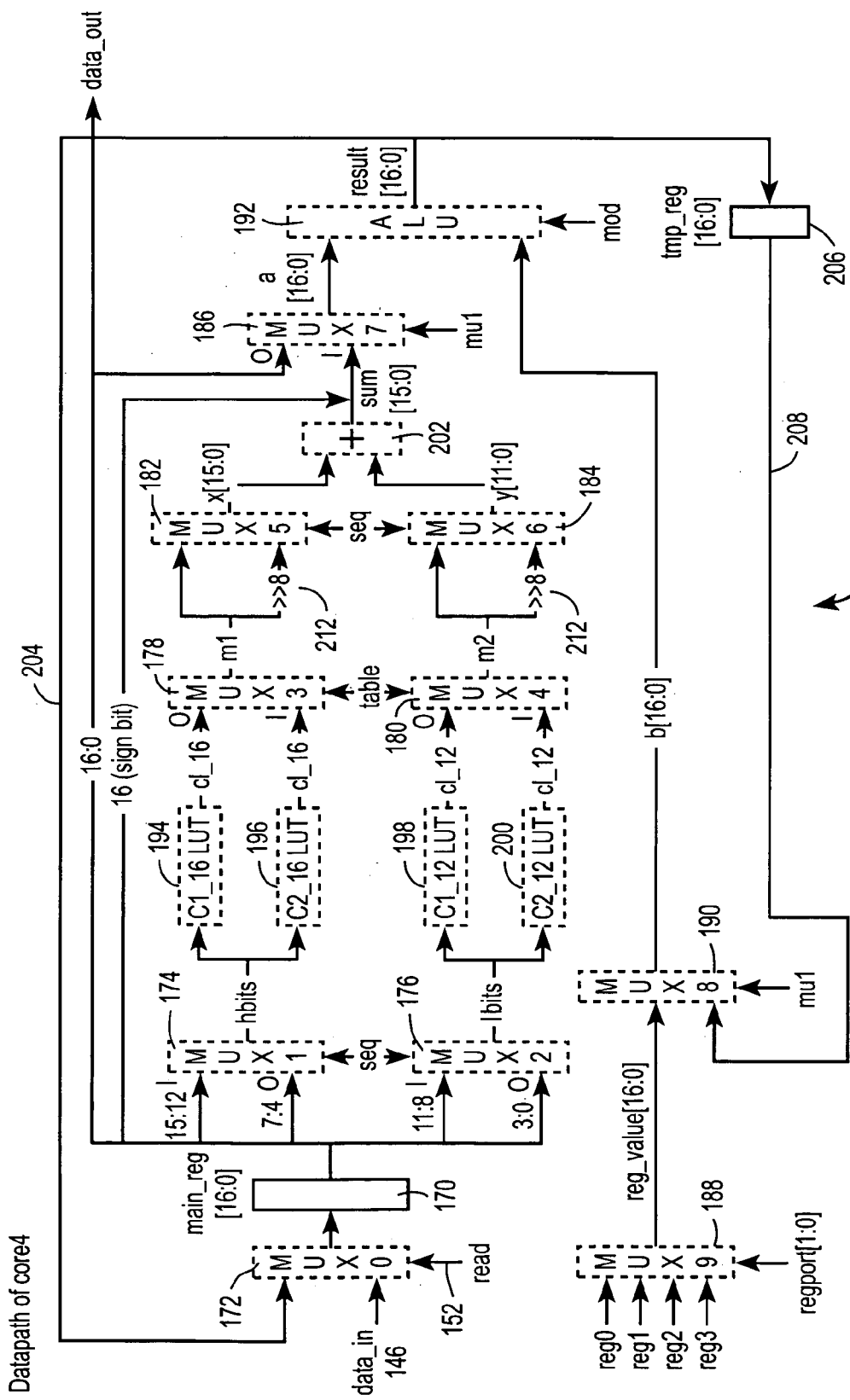
FIG. 7 is a detailed block diagram of one embodiment of a fourth type of core in accordance with the present invention.

Referring to FIG. 7, type 4 cores are shown with two pairs of lookup tables, C1_16, C1_12, and C2_16, C2_12. The type 4 core is the most complex type of core out of the four types, and includes core 70 of FIG. 3. Core 70 includes a main register 170, ten multiplexers 172, 174, 176, 178, 180, 182, 184, 186, 188 and 190, an ALU 192, lookup tables 194, 196, 198, and 200 and an adder 202. Main register 170 is 17-bits wide and receives data from multiplexer 172, selected either from incoming data (data_in) 146 or from feedback data 204 provided by the ALU 192, depending upon whether the READ signal 152 is selected. For example, if READ=0, then feedback data 204 is selected by multiplexer 172, else if READ=1, then input data 146 is selected. Cores 70 further includes a temporary register 206, which accepts feedback from ALU 192 and outputs the feedback data 204 to multiplexer 172. The intermediate value (as described subsequently as $V_i$ as in Eq. (4)) is stored in the temporary register 206.

Multiplexer 190 selects either the intermediate result in temporary register 206 or a feedback (data_out) signal selected from the four other cores, as designated by reg0, reg1, reg2, and reg3. It will become evident from the present description that for core 70, reg0 is data_out[3], reg1 is data_out[5], reg2 is data_out[6], and reg3 is data_out[7]. The control signals to regport[1:0] are used to select one of the four feedback data_out signals referenced as reg0, reg1, reg2 and reg3. These values are shown in Table 7.

TABLE 7

Control Signals of Core 70

| Clock | regport<br>[1:0] | mod | mul | seq | table |
|---|---|---|---|---|---|
| clk1 | 00 | 1 | 0 | 0 | 0 |
| clk2 | 00 | 0 | 1 | 1 | 0 |
| clk3 | 00 | 0 | 1 | 0 | 0 |
| clk4 | 10 | 1 | 0 | 0 | 0 |
| clk5 | 00 | 0 | 1 | 1 | 1 |
| clk6 | 00 | 0 | 1 | 0 | 1 |
| clk7 | 01 | 0 | 0 | 0 | 0 |

Feedback data 204 is determined from the ALU 192 based on a combination of control signals, namely mod, mul, seq, and regport[1:0]. Table 7 shows the values of these control signals. For example, the mod signal indicates a CUT or SATURATION mode. A mul signal indicates a multiply or no-multiply mode. A seq signal indicates a sequence mode. When the control signal mod=1, the ALU 192 will perform a CUT mode operation upon the output of multiplexers 186 and 190. When mod=0, the ALU 192 will perform a SATURATION mode operation.

LUTs 194 and 196 are 16-bit tables, while LUTs 198 and 200 are 12-bit tables, as seen in Table 8.

TABLE 8

Values Stored in LookUp Tables (LUT) for Core 70

Core 70

| LUT<br>C1_16 | LUT<br>C1_12 | LUT<br>C2_16 | LUT<br>C2_12 |
|---|---|---|---|
| 0 | 0 | 0 | 0 |
| b50 | b5 | 61f | 62 |
| 16a1 | 16a | c3f | c4 |
| 21f1 | 21f | 125e | 126 |
| 2d41 | 2d4 | 187e | 198 |
| 3892 | 389 | 1e9d | 1ea |

TABLE 8-continued

Values Stored in LookUp Tables (LUT) for Core 70

| Core 70 | | | |
|---|---|---|---|
| LUT C1_16 | LUT C1_12 | LUT C2_16 | LUT C2_12 |
| 43f2 | 43e | 24bd | 24c |
| 4f32 | 4f3 | 2adc | 2ae |
| 5a82 | 5a8 | 30fc | 310 |
| 65d3 | 65d | 371b | 372 |
| 7123 | 712 | 3d3b | 3d4 |
| 7c73 | 7c7 | 435a | 436 |
| 87c4 | 87c | 497a | 498 |
| 9314 | 931 | 4f99 | 4fa |
| 9e64 | 9e6 | 55b9 | 55c |
| a9b5 | a9b | 5bd8 | 5be |

It is noted that the difference between whether module 42 performs DCT and IDCT functions arises from the arrangement of the cores as described, the sequence of control signals applied to the cores, and from the selection of results stored in the LUTs to facilitate processing of the multiplication and addition operations.

The general process for performing the multiplication and addition will now be described with occasional reference made to FIGS. 8A–8B for illustrative purposes. When core 70 is operating, the two LUTs 194, 196 are used to perform the multiplication of 16 bits and 16-bit addition in two cycles. C1_16 and C2_16 are two LUTs representing a multiplier. C_12 and C2_12 are coefficients used in both IDCT and DCT. C1_16 and C1_12 are two LUTs representing the higher and lower bits of a multiplier with coefficient C1. Similarly, $C_{2-16}$ and C2_12 are two LUTs representing the higher and lower bits of a multiplier with coefficient C2. The contents of these LUTs are the result of the coefficients (C1 or C2) with a 4-bit multiplicand. In general, the LUTs are used in place of additional multipliers required by the prior art. In particular, a product found from a variable multiplied by a constant can be compared with results stored in the LUTs. Constant values can also be stored in the LUTs, and so long as one coefficient (multiplier) is constant, it can be retrieved from a LUT even though the input data (multiplicand) may vary. In DCT and IDCT operations, the coefficients used in the LUTS are the same. C1_16 LUT and C2_16 LUT accommodate 16-bit precision coefficients used for DCT and for IDCT operations with a 4-bit input, and a C1_12 accommodates 12-bits precision coefficients used for DCT and IDCT, which typically do not require the 16-bit precision. In order to determine the possible output values of the multiplication and store them in a LUT, the following Eq. (1) can be used.

$$\text{output} = \text{round}[\text{input} * C1], \text{ where } 0 < C1 < 1. \tag{1}$$

The input data is cut into 4-bit slices, and the constants (C1, C2) are each 16-bits, yielding an output of 20-bits for the C1_16 and C2_16 LUTs representing the DCT and IDCT coefficients. To obtain output values for the 12-bit C1_12 and C2_12 LUTs holding additional DCT and IDCT coefficients, Eq. (1) can also be used with the 4-bit input and the 16-bit constants (C1, C2) to calculate possible values of the output values to load these LUTs. Although the output is 20-bits, an 8-bit shift (212 in FIGS. 4–6) is used to modify the output of the lower bytes of the LUTS, C0_16, C)_12, C1_12, C1_16, C2_16 and C2_12 LUTs.

Using the 4 LUTs of FIG. 7 (that is, two 4×16 LUTs C1_16 and C2_16, and two 4×12 LUTs C1_12 and C2_12), two clock cycles are needed to complete a multiply-add operation as shown in Eq. (2). Equation (2) is very typical for DCT and IDCT butterfly algorithms, $$\text{result} = a \times c + b \tag{2}$$

where c is a constant cosine coefficient with a value less than 1, b is a common coefficient used in the DCT transform, and $a = \{a_{15}, a_{14}, a_{13}, \ldots, a_0\}$ representing a 16-bit binary number (ignoring the sign bit). To obtain a higher precision in Eq. (2), a 16-bit multiplicand (input) is selected. Each entry in the LUT represents a result, which are 16-bits. Given these parameters, the most direct approach to constructing a LUT yields one with 256×256=66536 entries, wherein each entry holds 16-bits. Such a LUT would be too large for VLSI, ASIC and SoC applications. Thus, with the present invention, the size of the LUTs can be reduced as follows. Because the multiplicand (input) is 16-bits long, either of the following arrangements can be used: two 8-input, 256-output LUTs; or alternatively, four 4-input, 16-output LUTs.

Figure 8A:
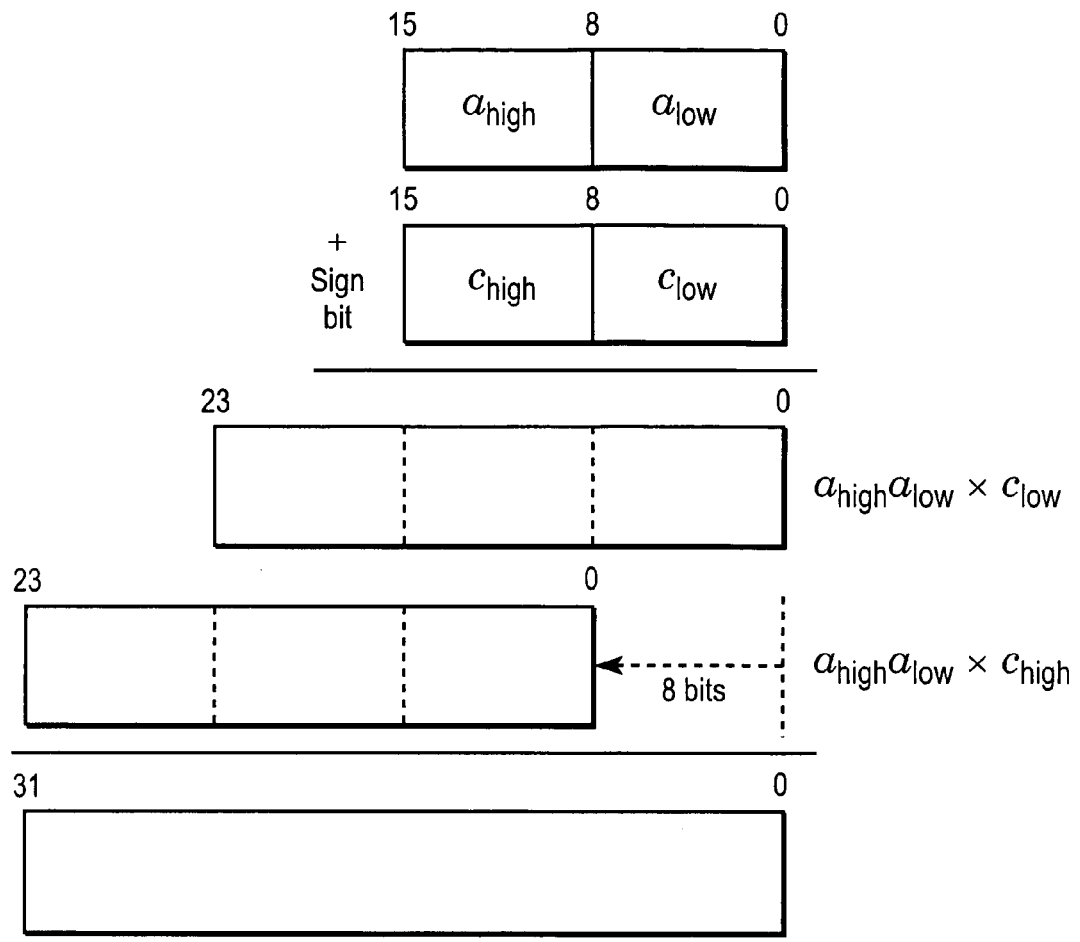
FIG. 8A is a block diagram of multiplication and add operations using two 8-input lookup tables.

Referring to FIG. 8A, the multiplier c is reduced from 16 bits to two 8-bit multipliers $c_{low}$ and $c_{high}$ in order to use the two 8-input, 256 output LUTs.

$$a = \sum A_i 2^{4i} \tag{3}$$

To use four 16-bit LUTs, the input a is divided into 4 parts according to Eq. (3), where $A_i$ is a 4-bit binary number defined by Eq. (4). This is shown in FIG. 8B.

$$A_i = \{a_{4i+3}, a_{4i+2}, a_{4i+1}, a_{4i}\} \tag{4}$$

Figure 8B:
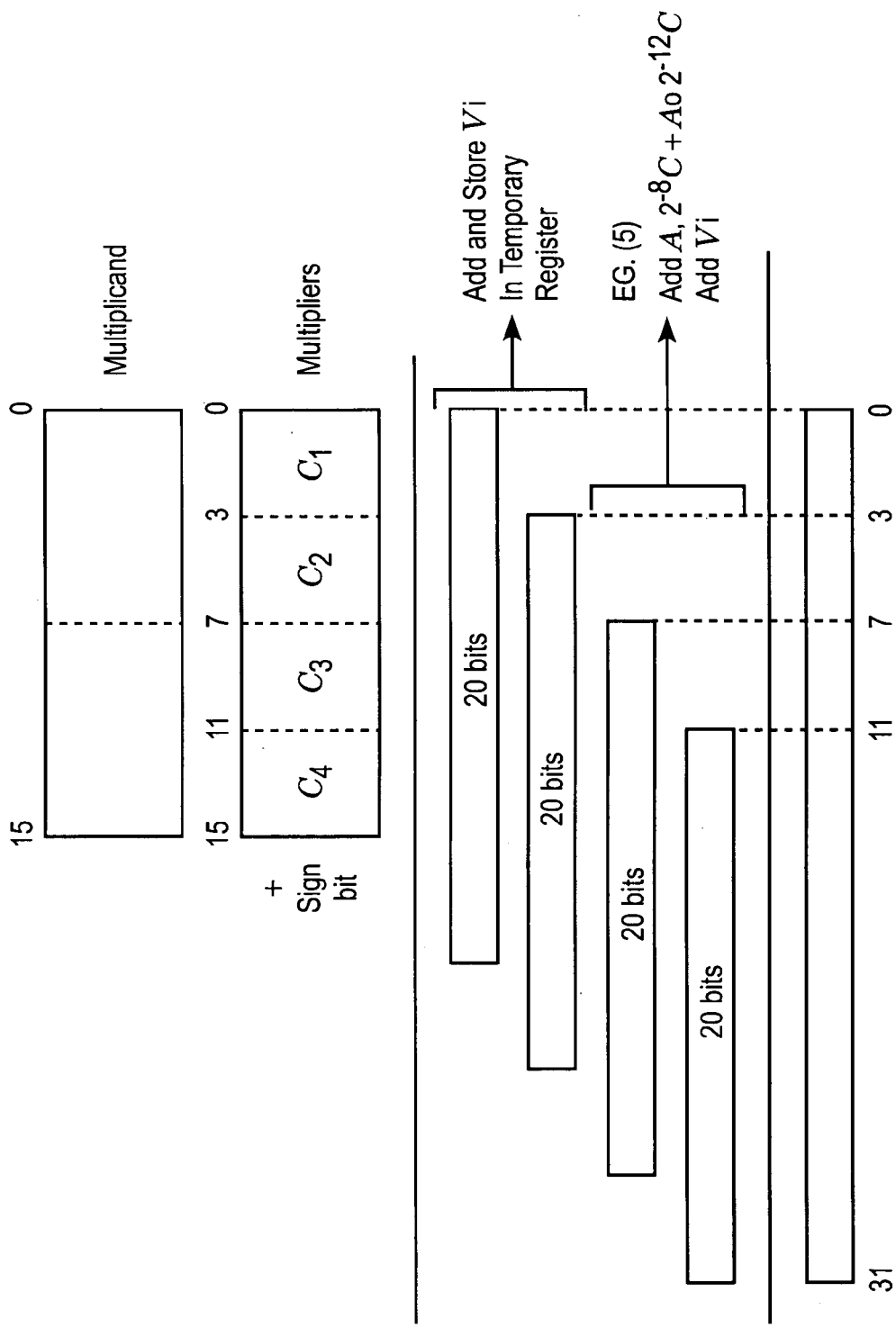
FIG. 8B is a block diagram of multiplication and add operations using four 4-input lookup tables in accordance with one embodiment of the present invention.

Still referring to FIG. 8B, the multiplier c is reduced from two 8-bit multipliers to four 4-bit multipliers, $c_1, c_2, c_3$ and $c_4$ yielding sub-results of 20-bits, and a final result of 32-bits. Moreover, since a 4-input/16-output ROM table has a much smaller area than that of an 8-input/256-output ROM table, the former is preferable to keep the hardware for the DCT/IDCT module 42 small, which is particularly useful for minimizing chip size.

Moreover, with the 2 LUTs, the result is obtain in 2 cycles. Because two cycles are used to complete the operation, a temporary register is used to store an intermediate result. The intermediate value can be defined as $V_i$ as in Eq. (5). The multiplication can be performed starting with the first cycle, where a 3-input adder computes the result of Eq. (5) from the partial products.

$$V_i = A_3 c + A_2 2^{-4} c + b \tag{5}$$

After the intermediate result $V_i$ is obtained, it can be used as an operand in the second cycle to be added to partial products in order to determine the result, as in Eq. (6).

$$\text{result} = A_1 2^{-8} c + A_0 2^{-12} c + V_i \tag{6}$$

The above method of the present invention completes the required multiply-add operation in 2 cycles. Reference to FIG. 8B indicates that the above calculations requires bit number shifts as already described.

An aspect in accordance with the present invention is to provide DCT and IDCT functionality in manner that avoids the large computations conventionally associated with multipliers and stages of multipliers for obtaining the multiply and add operations. With the present invention, a total of 5 multiplications are used during the DCT transform, as compared with conventional approaches for fast one dimensional DCT typically taking 6–8 multiplications. A total of 5 multiplications is readily seen from considering that during a 7-cycle DCT or IDCT calculation, there are two multiplications performed, each in cores 66 and 72, and one multiplication performed in core 70.

Another aspect in accordance with the present invention is to improve or maintain a high quality of image compression results. Conventional compression standards like the MPEG-1 typically require an output precision of 8-bits, while the MPEG-2 requires up to 12-bits. With the present invention, the internal accuracy of module 42 is 17 bits, with a DCT output saturated to 8 bits or 12 bits. By providing a higher level of precision during the DCT transform, the present invention results in very small errors over the ideal floating, as compared with conventional approaches.

Furthermore, with the present invention, a simplified logic design is provided with 8 cores of varying types of complexity, instead of each core having the same number of multipliers. In one aspect in accordance with the present invention, the hardware design of module 42 is streamlined so that some cores (62, 64, 68, 70) require no multipliers, while other cores have multipliers that are sometimes bypassed. For example, cores 66, 70, and 72 are bypassed when not performing the two multiplications. Furthermore, the hardware design of module 42 is very compact in design, thereby using a minimal amount of chip area as well as a simple layout, placement and routing of components. For example, conventional one dimensional DCT approaches use a 16×16 DCT chip containing 42,000 devices capable of processing 30 images/sec in real time, with the image size being 512×768 pixels. IDCT processing is not included in such conventional approaches. By contrast, the present invention may work suitably well with approximately 27,000 devices, and can perform two-dimensional DCT and IDCT processing contemporaneously for the same size image at the same frame rate. Other prior art approaches for two-dimensional DCT processing use roughly 114,300 devices, by comparison. Without the present invention, either a larger chip area to accommodate a very large (65,536) LUT or very big 16×16-bit multiplier is required.

With the present invention, the DCT and IDCT functions are treated similarly, with the difference being the coefficients for each function. Real time DCT and IDCT processing can be implemented at 20×480×30 frames per second, by way of example. Seven clock cycles are required to complete a one-dimensional DCT operation in the x or y direction. The present invention provides 8 pixels DCT in seven clocks, outputting 8 coefficients. Since each block has 8×8 pixels (e.g., macroblock has 8×8 Y, 8×8 U and 8×8V), the x-direction for forward DCT uses 7 cycles, and the output is written to RISC file. In order to undertake the y-direction forward DCT, module 42 reads the RISC file, transposes the datablock, and performs the y-direction DCT in 7 cycles. Seven cycles are used to complete a one way (i.e., one dimensional) DCT transform, while each multiplication takes only two cycles.

Even though the DCT/IDCT module 42 of FIG. 3 has been described with respect to the specific architecture of 8 cores in FIGS. 4–7, it will be appreciated that DCT/IDCT module 42 may work suitably well with other architectures of video processing systems. Similarly, the DCT/IDCT module 42 is not limited to only performing the sequence of steps described herein with regard to image compression. Those skilled in the art will understand that the DCT/IDCT module 42 may operate suitably well with other sequences of steps and functions to provide video compression.

After reviewing this disclosure, those skilled in the art will recognize that the present invention applies not only to DCT and IDCT results determined according to the pixel-by-pixel technique described above, but may be extended to DCT and IDCT operations found with other schemes. Furthermore, it will be appreciated by those of ordinary skill in the art that the present invention may be practiced in a variety of ways and is applicable to video standards following ISO MPEG, MPEG-1, MPEG-2, MPEG-4, H.261, H.263, H.323 standards, as well as the ITU-Telecom H.262.

Although the invention has been described in considerable detail with reference to certain embodiments, other embodiments are possible. As will be understood by those of skill in the art, the invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A DCT/IDCT circuit for enabling forward and inverse discrete cosine transform of a data block, comprising:

a plurality of cores, each having input data and output data, wherein the input data includes external data and feedback data output from selected ones of the cores, and wherein the plurality of cores includes a first core having a first input, a second input and an output for performing forward DCT and IDCT operations, the first input of the first core coupled to receive external data;

a second core having a first input, a second input and an output for performing forward DCT and IDCT operations, the first input of the second core coupled to receive external data, and the second input of the second core coupled to the output of the first core; and a third core having a first input, a second input and an output for performing forward DCT and IDCT operations, the first input of the third core coupled to receive external data, the second input of the third core coupled to the output of the second core and the output of the third core coupled to the second input of the first core to provide feedback data.

2. The DCT/IDCT circuit according to claim 1, further comprising:

a sequence generator coupled to each core.

3. The DCT/IDCT circuit according to claim 1, wherein the selected ones of the cores comprises four cores.

4. The DCT/IDCT circuit according to claim 1, wherein the external data comprises the data block, the data block including prediction data processed by an MEC engine communicatively coupled to the DCT/IDCT circuit.

5. The DCT/IDCT circuit according to claim 1, wherein the external data comprises the data block, the data block including reconstruction data processed by an inverse quantizer module communicatively coupled to the DCT/IDCT circuit.

6. The DCT/IDCT circuit according to claim 1, wherein the plurality of cores comprises 8 cores.

7. The DCT/IDCT circuit according to claim 1, wherein the plurality of cores comprises four types of cores.

8. The DCT/IDCT circuit according to claim 7, wherein a first type of core includes a main register for storing the input data and the feedback data.

9. The DCT/IDCT circuit according to claim 7, wherein a second type of core includes a first pair of lookup tables, and a third type of core includes a second pair of lookup tables.

10. The DCT/IDCT circuit according to claim 7, wherein a fourth type of core includes two pairs of lookup tables.

11. A DCT circuit enabling forward discrete cosine transform of a data block, comprising:
a plurality of cores, each having input data and output data, wherein the input data includes external data and feedback data output from selected ones of the cores, and wherein the plurality of cores includes
a first core having a first input, a second input and an output for performing forward DCT operations, the first input of the first core coupled to receive external data, and
a second core having a first input, a second input and an output for performing forward DCT operations, the first input of the second core coupled to receive external data, the second input of the second core coupled to the output of the first core; and
a third core having a first input, a second input and an output for performing forward DCT operations, the first input of the third core coupled to receive external data, the second input of the third core coupled to the output of the second core and the output of the third core coupled to the second input of the first core to provide feedback data.

12. The DCT circuit according to claim 11, further comprising:
a sequence generator coupled to each core.

13. The DCT circuit according to claim 11, wherein the selected ones of the cores comprises four cores.

14. An IDCT circuit enabling inverse discrete cosine transform of a data block, comprising:
a plurality of cores, each having input data and output data, wherein the input data includes external data and feedback data output from selected ones of the cores, and wherein the plurality of cores includes
a first core having a first input, a second input and an output for performing IDCT operations, the first input of the first core coupled to receive external data, and
a second core having a first input, a second input and an output for performing IDCT operations, the first input of the second core coupled to receive external data, the second input of the second core coupled to the output of the first core; and
a third core having a first input, a second input and an output for performing IDCT operations, the first input of the third core coupled to receive external data, the second input of the third core coupled to the output of the second core and the output of the third core coupled to the second input of the first core to provide feedback data.

15. The IDCT circuit according to claim 14, further comprising:
a sequence generator coupled to each core.

16. The IDCT circuit according to claim 14, wherein the selected ones of the cores comprises four cores.

17. A DCT/IDCT circuit for enabling forward and inverse discrete cosine transform of a data block, comprising:
means for receiving input data associated with the data block;
coupled to the means for receiving, first means for selecting one of the input data and a sum of the input data and feedback data to provide first output data;
coupled to the first means, second means for determining a sum of first partial products based on the input data, the feedback data, and first coefficient data to provide second output data;
coupled to the means for receiving input data, third means for determining a sum of second partial products based on the input data, the feedback data, and second coefficient data to provide third output data;
coupled to the means for receiving input data, fourth means for determining a sum of additional partial products based on the input data, the feedback data, and additional coefficient data to provide third output data; and
means for outputting the first output data, the second output data and the third output data collectively representing a result of one of the forward discrete cosine transform and the inverse discrete cosine transform.

18. The DCT/IDCT circuit according to claim 17, further including means for obtaining the final result within two clock cycles.

* * * * *